US010685028B2

(12) United States Patent
Davis, III et al.

(10) Patent No.: US 10,685,028 B2
(45) Date of Patent: *Jun. 16, 2020

(54) CONTEXTUAL OWNERSHIP

(71) Applicants: AT&T Intellectual Property I, L.P., Atlanta, GA (US); AT&T Mobility II LLC, Atlanta, GA (US)

(72) Inventors: John P. Davis, III, Marietta, GA (US); Quinn Aguirre, Duluth, GA (US); Fulvio Cenciarelli, Suwanee, GA (US); Jeffrey Mikan, Atlanta, GA (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/115,678

(22) Filed: Aug. 29, 2018

(65) Prior Publication Data

US 2019/0026343 A1    Jan. 24, 2019

Related U.S. Application Data

(63) Continuation of application No. 14/958,008, filed on Dec. 3, 2015, now Pat. No. 10,095,746.

(51) Int. Cl.
| | |
|---|---|
| *G06F 16/2457* | (2019.01) |
| *G06F 21/88* | (2013.01) |
| *H04W 12/00* | (2009.01) |
| *G06F 21/31* | (2013.01) |
| *G06F 21/62* | (2013.01) |
| *G06F 16/2458* | (2019.01) |
| *G06F 16/9537* | (2019.01) |

(52) U.S. Cl.
CPC .... *G06F 16/24575* (2019.01); *G06F 16/2477* (2019.01); *G06F 16/9537* (2019.01); *G06F 21/316* (2013.01); *G06F 21/6245* (2013.01); *G06F 21/88* (2013.01); *H04W 12/00508* (2019.01)

(58) Field of Classification Search
None
See application file for complete search history.

(56) References Cited

U.S. PATENT DOCUMENTS

| | | |
|---|---|---|
| 6,334,121 B1 | 12/2001 | Primeaux |
| 6,704,819 B1 | 3/2004 | Chrysanthakopoulos |
| 8,473,429 B2 | 6/2013 | Cheng et al. |

(Continued)

OTHER PUBLICATIONS

Maher, David P., Jack Lacy, and Gilles Boccon-Gibod. "Trust, Privacy, Security, and Safety Principles for a Personal Internet of Things.", 7 pages.

(Continued)

*Primary Examiner* — William S Powers
*Assistant Examiner* — Arezoo Sherkat
(74) *Attorney, Agent, or Firm* — Scott P. Zimmerman, PLLC

(57) ABSTRACT

Consistent contextual patterns may confirm ownership. Current usage of mobile and smart devices may be compared to historical usage. If a device is being used as historically observed, then ownership of the device may be confirmed. If, however, the current usage fails to coincide with historical usage, new ownership may be inferred.

20 Claims, 31 Drawing Sheets

(56) References Cited

U.S. PATENT DOCUMENTS

| | | |
|---|---|---|
| 8,551,186 B1 | 10/2013 | Strand |
| 8,577,333 B2 | 11/2013 | Bennett et al. |
| 8,578,153 B2 | 11/2013 | Johansson et al. |
| 9,014,669 B1 | 4/2015 | Abou-El-Ella |
| 9,083,687 B2 | 7/2015 | Davis et al. |
| 9,111,214 B1 | 8/2015 | Sharma et al. |
| 9,706,406 B1 | 7/2017 | Adams |
| 2004/0203768 A1* | 10/2004 | Ylitalo .............. H04M 1/72572 455/435.1 |
| 2010/0317371 A1* | 12/2010 | Westerinen ....... H04M 1/72566 455/456.6 |
| 2013/0166726 A1 | 7/2013 | Boldyrev et al. |
| 2013/0191887 A1 | 7/2013 | David |
| 2014/0244834 A1 | 8/2014 | Guedalia et al. |
| 2014/0283014 A1 | 9/2014 | Tse |
| 2014/0292477 A1 | 10/2014 | Ahmadloo |
| 2014/0333414 A1 | 11/2014 | Kursun |
| 2015/0033305 A1* | 1/2015 | Shear ..................... G06F 21/45 726/11 |
| 2015/0067320 A1 | 3/2015 | Chatterton |
| 2015/0113172 A1 | 4/2015 | Johnson et al. |
| 2015/0134954 A1 | 5/2015 | Walley et al. |
| 2015/0244853 A1 | 8/2015 | Shin et al. |
| 2015/0295713 A1 | 10/2015 | Oxford |
| 2015/0312041 A1 | 10/2015 | Choi |
| 2015/0358790 A1 | 12/2015 | Nasserbakht |
| 2015/0371023 A1 | 12/2015 | Chen |
| 2015/0373529 A1* | 12/2015 | Scarr ...................... H04W 4/16 455/414.1 |
| 2016/0012245 A1 | 1/2016 | Cudak |
| 2016/0066189 A1 | 3/2016 | Mahaffey |
| 2016/0180618 A1 | 6/2016 | Ho |
| 2016/0182502 A1* | 6/2016 | Smith ................. H04L 63/0861 726/7 |
| 2016/0210450 A1 | 7/2016 | Su |
| 2016/0307380 A1 | 10/2016 | Ho |
| 2016/0360376 A1 | 12/2016 | Bostick |

OTHER PUBLICATIONS

Singh, Jatinder, Thomas FJ-M. Pasquier, and Jean Bacon. "Securing Tags to Control Information Flows within the Internet of Things." *Recent Advances in Internet of Things (RIoT), 2015 International Conference on*. IEEE, Apr. 2015, 7 pages.

* cited by examiner

CONTEXTUAL OWNERSHIP

CROSS-REFERENCE TO RELATED APPLICATION

This application is a continuation of U.S. application Ser. No. 14/958,008 filed Dec. 3, 2015 and since issued as U.S. Pat. No. 10,095,746, and incorporated herein by reference in its entirety.

BACKGROUND

Mobile communications have revolutionized our lives. As connected devices proliferate, second hand transfers are inevitable. Indeed, people are already buying, selling, and handing down wireless smartphones, watches, cameras, and other connected devices. Sensitive information (such as social security numbers and physiological data) may thus be inadvertently revealed.

BRIEF DESCRIPTION OF THE SEVERAL VIEWS OF THE DRAWINGS

The features, aspects, and advantages of the exemplary embodiments are understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
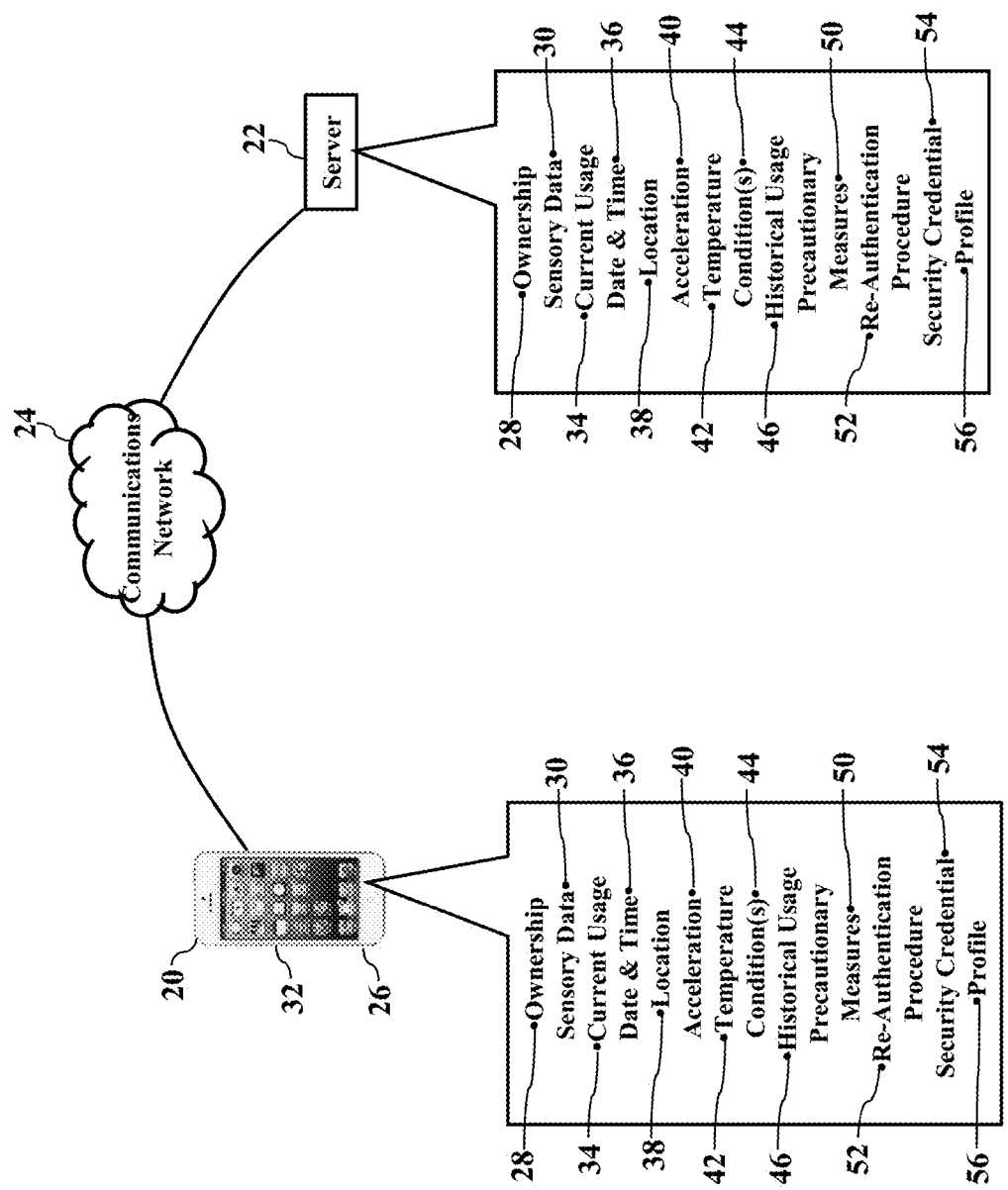
FIGS. 1-9 are simplified schematics illustrating an environment in which exemplary embodiments may be implemented.

FIG. 1 is a simplified schematic illustrating an environment in which exemplary embodiments may be implemented. FIG. 1 illustrates a smart device 20 communicating with a server 22 using a communications network 24. The smart device 20, for simplicity, is illustrated as a mobile smartphone 26, which most readers carry and use. The smart device 20, however, may be any mobile or stationary processor-controlled device, as later paragraphs will explain. Regardless, as a user carries and uses the smartphone 26, its ownership 28 may be determined. That is, exemplary embodiments may infer when rightful or wrongful possession or use has changed, based on sensory data 30 collected by sensors 32. The ownership 28 may be determined by the smartphone 26, by the server 22, or by cooperation between the smartphone 26 and the server 22 (as later paragraphs will explain).

The ownership 28 may be based on a current usage 34. As most readers likely understand, the smartphone 26 may obtain the current date and time 36, its current location 38, an acceleration value 40, and even a temperature 42. Moreover, exemplary embodiments may also determine many other conditions 44, which later paragraphs will explain. Any of this sensory data 30 and/or the conditions 44 may determine the current usage 34 of the smartphone 26. Exemplary embodiments may then infer the ownership 28 based on the current usage 34. If, for example, the current usage 34 differs from its habitual, historical usage 46, exemplary embodiments may conclude or infer that the ownership 28 has changed. The smartphone 26 may thus have been sold, transferred, lost, or even stolen.

Precautionary measures 50 may be implemented. When the current usage 34 indicates that the ownership 28 may have changed, a re-authentication procedure 52 may be required. That is, any current user may be prompted to input any security credential(s) 54 (such as a username, password, spoken phrase, and/or fingerprint). If the security credential 54 matches an existing profile 56 associated with the smartphone 26, then perhaps ownership 28 has not changed and perhaps no further precautionary measures 50 are needed. The user, in other words, may be legitimate.

Figure 2:
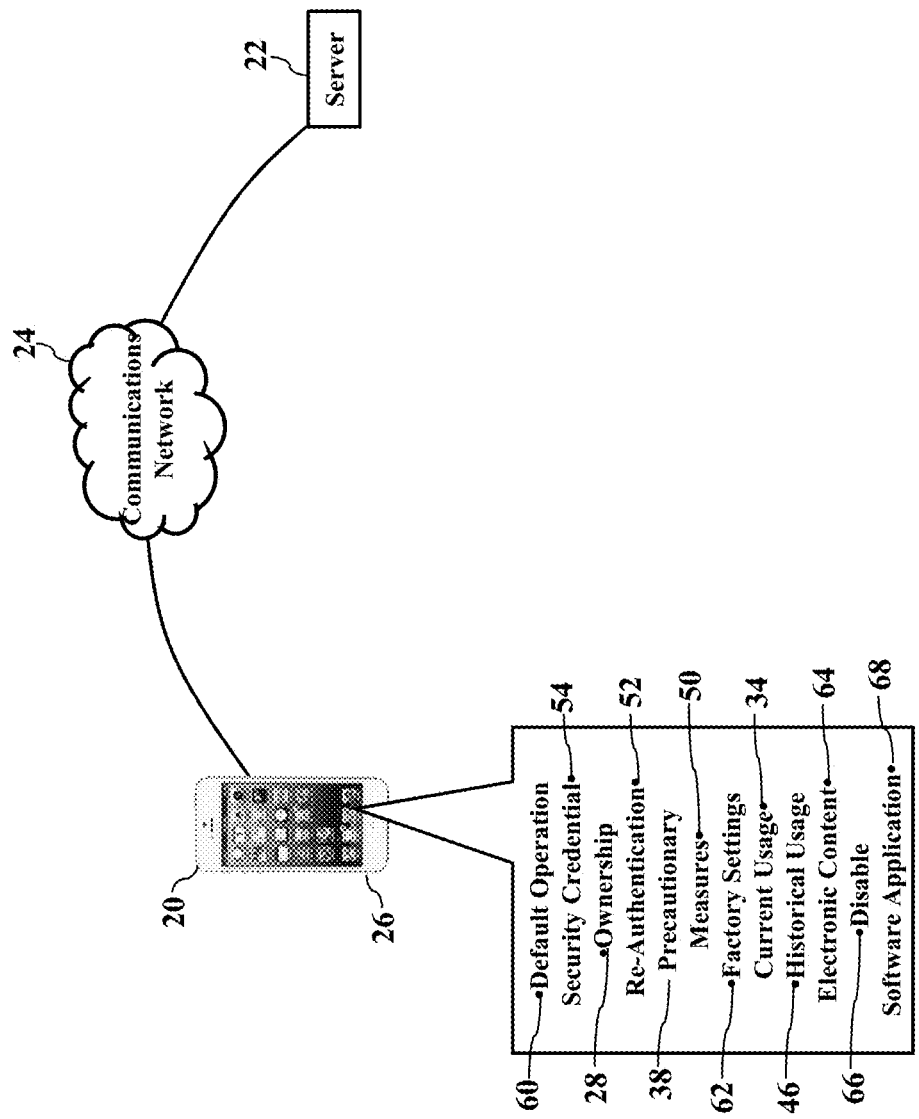

FIG. 2, though, illustrates a default operation 60. If the current user inputs an incorrect security credential 54, the ownership 28 may be presumed to have changed. A failure of the re-authentication procedure 52, in other words, may require further precautionary measures 50. FIG. 2, for simplicity, illustrates the smartphone 26 implementing the additional precautionary measures 50, such as the default operation 60. The server 22, though, may additionally implement these additional precautionary measures 50 and instruct the smartphone 26 to revert to the default operation 60. Regardless, the smartphone 26 may default to factory settings 62. If the current usage 34 differs from the habitual, historical usage 46, the factory settings 62 may revert the smartphone's operation to an out-of-the-box experience that removes or deletes any personalized settings and/or content. For example, the smartphone 26 may prevent local and/or remote retrieval of photos, contacts, videos, voicemails, and text messages. The default operation 60 thus helps prevent access to, and usage of, any stored electronic content 64 that may potentially contain private and sensitive information.

The default operation 60 may also disable 66 any software applications 68. As the reader may understand, many software applications 68 (or "apps") may be preloaded and/or downloaded to the smartphone 26. These software applications 68 provide many different services, such as games, movies, weather, and news. Indeed, many of these software applications 68 may process mobile payments and investment data, perhaps even accessing or using login information, account information, and credit card information. Exemplary embodiments may thus disable 66 any operation or feature associated with any software application 68 to again help prevent disclosure of private and sensitive information.

Figure 3:
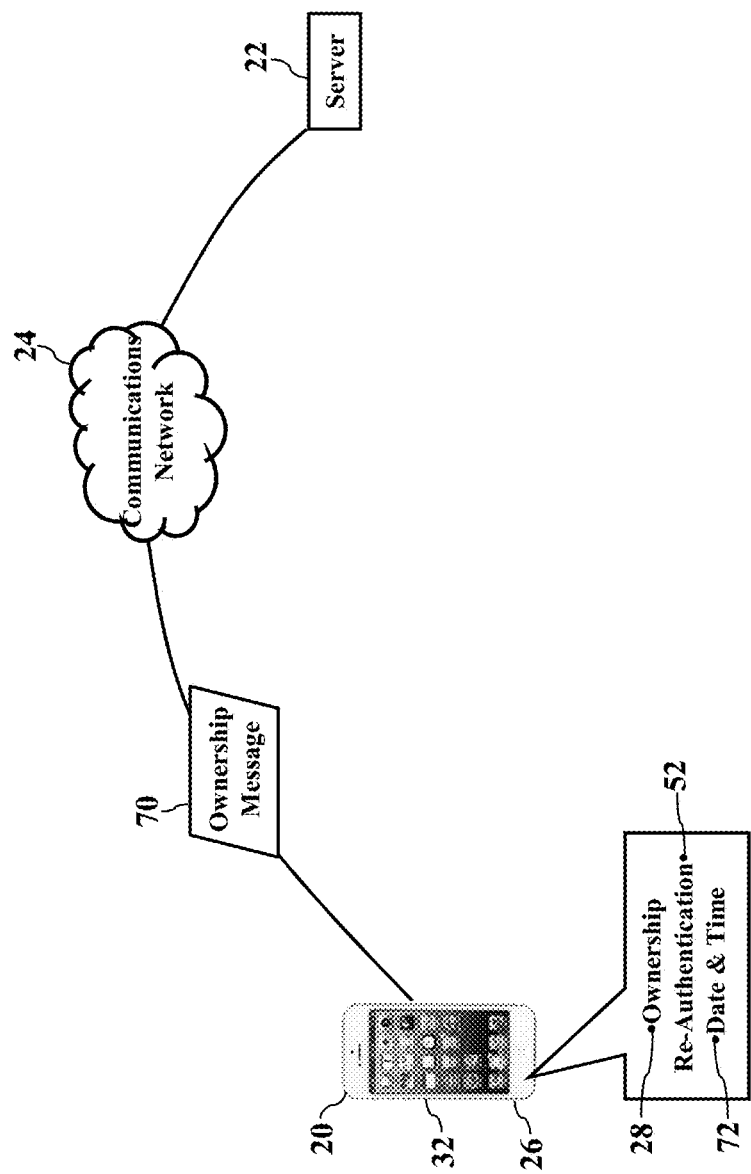

FIG. 3 illustrates remote notifications. Whenever the ownership 28 is presumed to have changed, electronic notifications may be sent. For example, the smartphone 26 may alert any service provider or network element of its ownership 28. Suppose, for example, that the smartphone 26 self-determines its ownership 28 has changed. The smartphone 26 may generate and send an electronic ownership message 70 to the server 22. The ownership message 70 may include information explaining the user's failure to authenticate (perhaps via the re-authentication procedure 52) and the potential new ownership 28. The ownership message 70 may also be timestamped with a date and time 72 associated with the change in the ownership 28. The ownership message 70 thus notifies the server 22 that the ownership 28 has changed as of the date and time 72.

Figure 4:
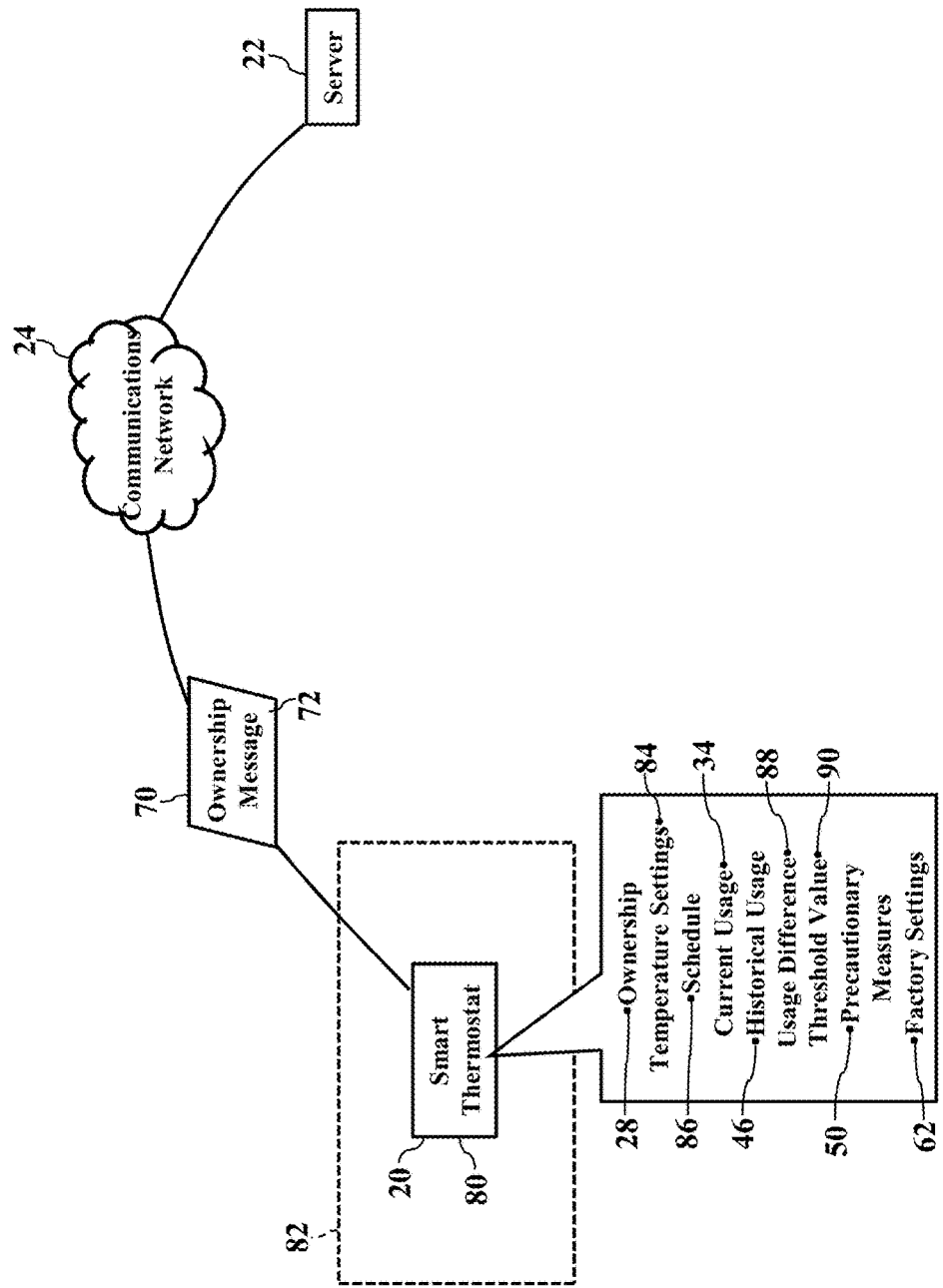

FIG. 4 illustrates perhaps a familiar example. Here a smart thermostat 80 is another example of the smart device 20 that may determine its ownership 28. The smart thermostat 80 is installed in a building 82 (such as a home or business), as the reader understands. The smart thermostat 80 monitors the user's temperature settings 84 to infer a heating and cooling schedule 86. The smart thermostat 80, in other words, monitors its current usage 34 and compares to its historical usage 46. Over time the smart thermostat 80 learns the user's preferred temperature settings 84 and anticipates heating and cooling needs. Because the reader is assumed familiar with the general operation and benefits provided by the smart thermostat 80, no further details are needed.

Here, though, the ownership 28 may also be learned. Suppose the home 82 is owned/rented for several months or years by the same user or family. When the family sells or moves, a new owner/renter takes occupancy. The new occupant will thus begin establishing new or different temperature settings 84, which will likely differ from the historical usage 46 (based on the previous occupant). The smart thermostat 80 may thus determine a usage difference 88 between the current usage 34 and the historical usage 46. If the usage difference 88 exceeds some threshold value 90, the smart thermostat 80 may conclude or infer that its ownership 28 has changed. The smart thermostat 80 may implement the precautionary measures 50, such as reverting to its factory settings 62. This reversion may cause the smart thermostat 80 to ignore or delete the historical usage 46 and begin anew with its learning mechanism or programming. The new ownership 28, in other words, causes the smart thermostat 80 to adapt to the new owner. If the smart thermostat 80 has network access, the smart thermostat 80 may even generate and send the electronic ownership message 70 to any destination network address (such as the server 22). The ownership message 70 may describe or explain the new ownership 28 as of the date and time 72.

Figure 5:
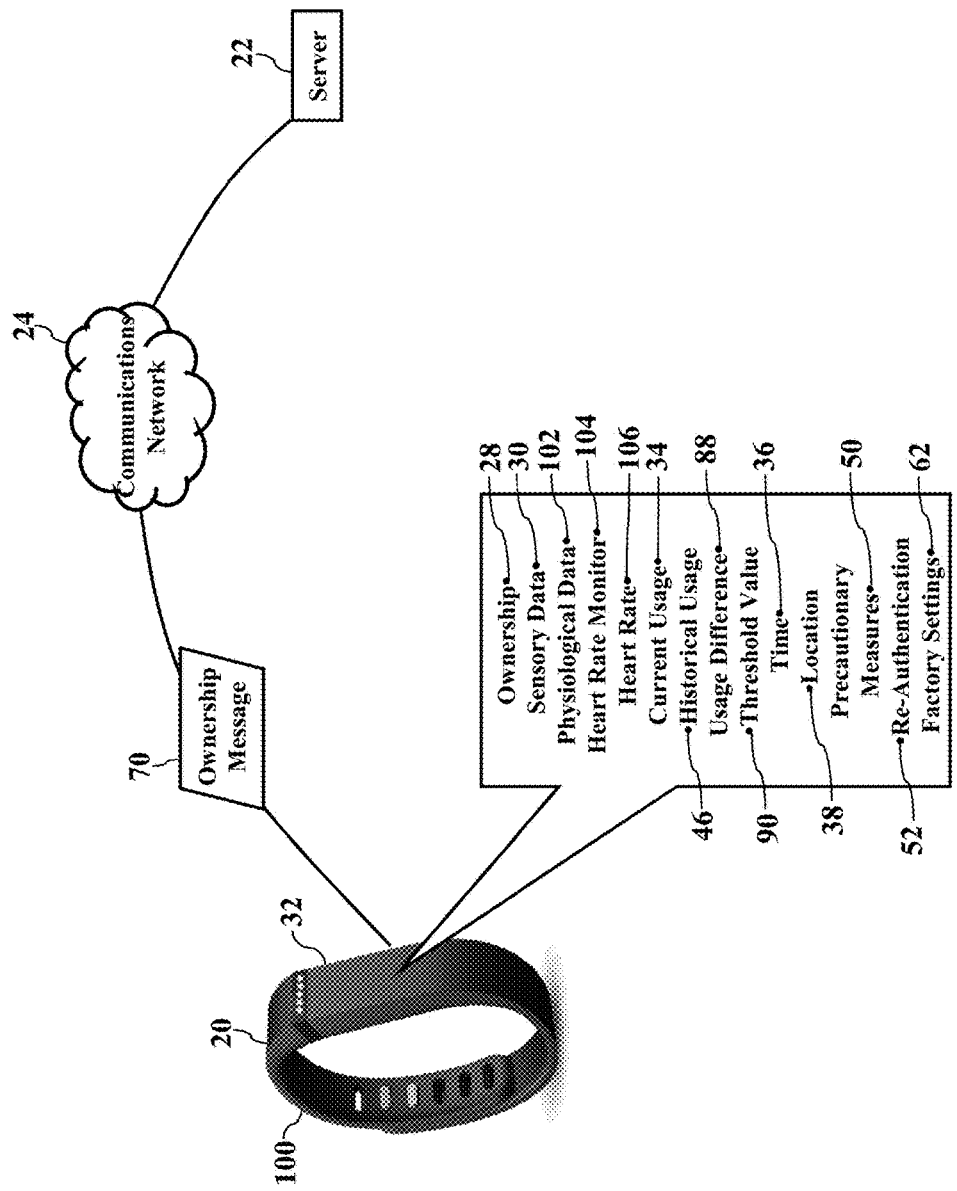

FIG. 5 illustrates still another example. Here the reader may recognize the smart device 20 as a smart fitness monitor 100. The fitness monitor 100 has one or more of the sensors 32 that collect the sensory data 30. When the fitness monitor 100 is strapped or otherwise worn around a wrist or chest of the user, the fitness monitor 100 may collect physiological data 102 from which the user's health may be inferred. The reader may recognize a familiar example in which the sensor 32 acts as a heart rate monitor 104 and collects the physiological data 102 indicating the user's heart rate 106. Because the reader is assumed familiar with the general operation of performance monitors, no further details are needed.

Here, though, the ownership 28 may again be determined. The smart fitness monitor 100 is another example of the connected smart device 20 that may be bought, sold, or otherwise transferred to different owners. Indeed, there are many companies and web sites dealing in used devices. The smart fitness monitor 100 may thus intelligently determine when new ownership 28 has occurred. As the fitness monitor 100 is used, over time the fitness monitor 100 may collect and/or store a repository of the user's heat rate 106. Should the fitness monitor 100 suddenly or gradually observe or detect a change in the average or instantaneous heart rate 106, the ownership 28 may have changed. The smart fitness monitor 100, in other words, may compare its current usage 34 to its historical usage 46. If the usage difference 88 satisfies or exceeds the threshold value 90, the fitness monitor 100 may conclude or infer that its ownership 28 has changed. In plain words, if the current heart rate 106 fails to match what is historically expected (perhaps based on the time 36 and/or the location 38), then new ownership 28 may be determined. The fitness monitor 100 may implement the precautionary measures 50, such as prompting for the re-authentication procedure 52 and/or reverting to its factory settings 62. If new ownership 28 is confirmed, the fitness monitor 100 may ignore or delete its historical usage 46, thus allow the new owner/user to establish her own statistical average/mean heart rate 106. Exemplary embodiments thus protect the physiological data 102 from disclosure in response to the new ownership 28. Moreover, the fitness monitor 100 may also send the electronic ownership message 70 to notify of the new ownership 28.

Figure 6:
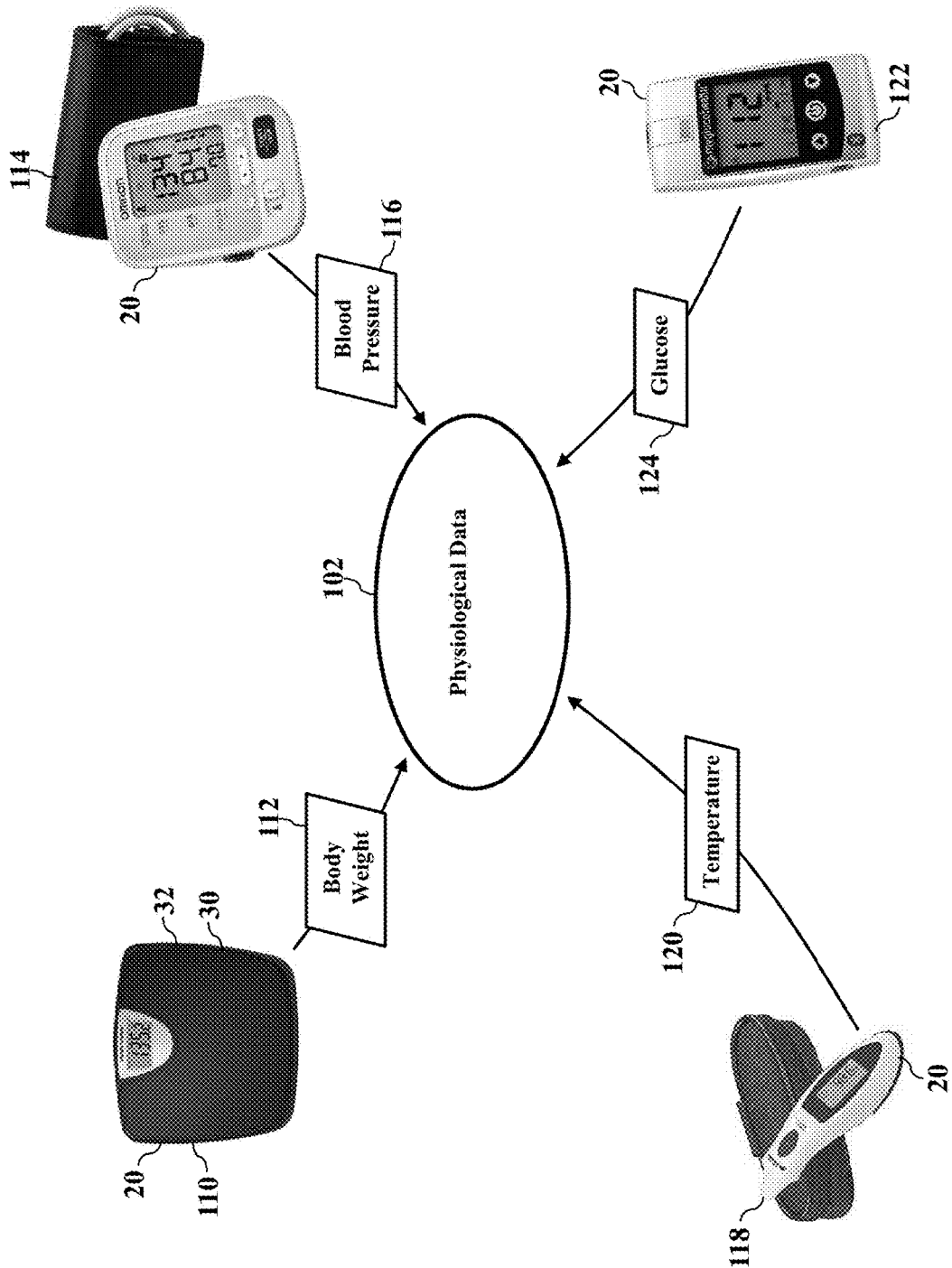

FIG. 6 illustrates even more examples. Here exemplary embodiments may protect any physiological data 102 from inadvertent disclosure to a new owner. The reader, for example, may recognize a smart weight scale 110 as another one of the smart devices 20. When the user steps on the weight scale 110, the sensor 32 generates the sensory data 30 representing the user's body weight 112. The weight scale 110 may then locally store the user's body weight 112 in its memory (not shown for simplicity). The weight scale 110 may even log or track the user's body weight 112 over time and calculate statistical measures (such as an average weight and gaining/losing trends). The weight scale 110 may even report the user's body weight 112 to some remote destination (such as the server 22 illustrated in FIGS. 1-5). Again, then, over time the weight scale 110 may store a repository of the personal physiological data 102 associated with the user. If the weight scale 110 were later sold or given away, the new owner/user could access this personal and perhaps private physiological data 102.

Other smart devices 20 are illustrated. The user may also have a smart blood pressure cuff 114 that monitors and reports the user's blood pressure 116. A thermometer 118 measures and reports the user's temperature 120, and a glucometer 122 measures and reports the user's blood sugar/glucose 124. Over time this physiological data 102 may be locally and/or remotely stored and analyzed for long term averages and trends. If, however, any of these smart devices 20 were sold or given away, the physiological data 102 could be inadvertently revealed to the new user/owner.

Figure 7:
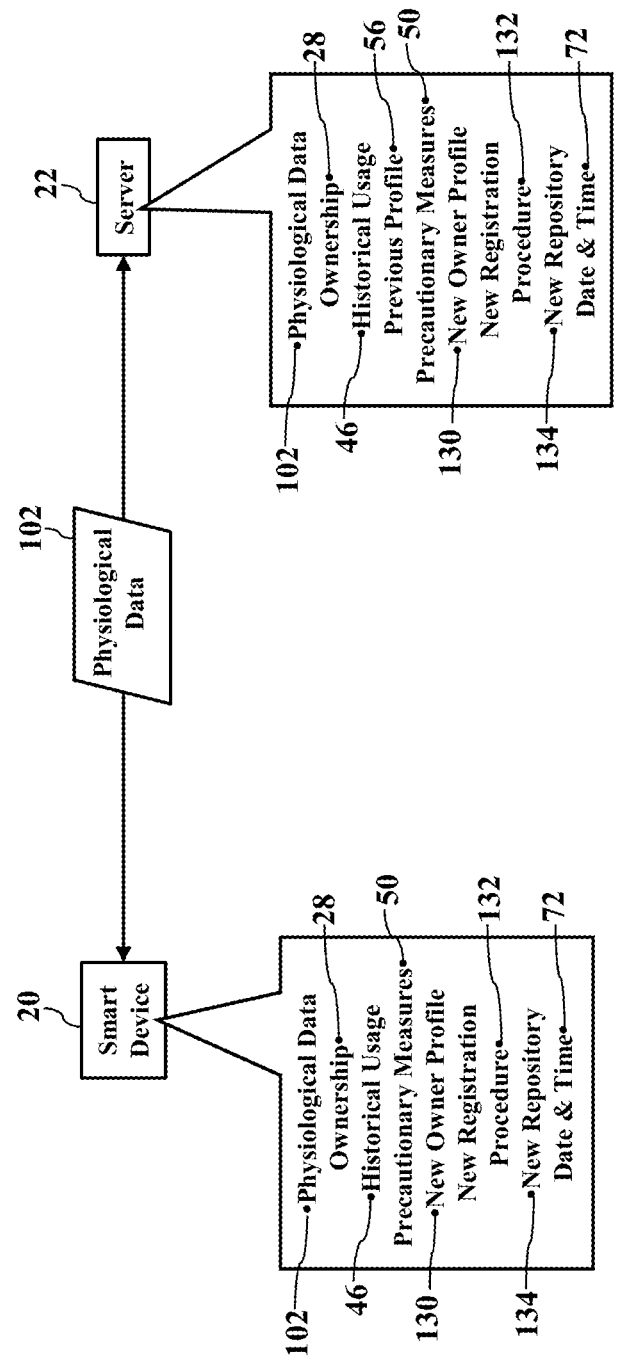

FIG. 7 further illustrates the precautionary measures 50. The physiological data 102 may be especially private and/or sensitive and highly individual. When the ownership 28 of the smart device 20 changes, the previous user's physiological data 102 may adversely taint or affect a subsequent user's data and trends. Historical heart rates (as illustrated in FIG. 5), for example, likely have no relevance to the new owner. Similarly, the previous owner's average or historical body weight 112, blood pressure 116, body temperature 120, and blood sugar/glucose 124 (all illustrated in FIG. 6) have no bearing on the new owner's/user's health. Indeed, the stored historical usage 46 may even negatively impact the new owner (such as causing false positives or skewing health insurance rates). The precautionary measures 50 may thus close or halt collection of the physiological data 102 in response to the new ownership 28. If the new owner/user wishes to continue collection of the physiological data 102, exemplary embodiments may require a new owner profile 130. The determination of new ownership 28 may thus require a new registration procedure 132 that establishes the new owner profile 130. Any historical physiological data 102 (e.g., the historical usage 46) may thus be closed out and no new entries added. Indeed, the new registration procedure 132 may even instruct the smart device 20 to delete, clear, and/or purge the historical usage 46 from its local memory (not shown for simplicity). The new user/owner may thus be forced to establish the new owner profile 130 that generates a new repository 134 for the latest physiological data 102 acquired or sensed after the date 72 and time associated with the change in the ownership 28.

The server 22 may implement similar precautionary measures 50. If the smart device 20 uploaded any physiological data 102 to the server 22, the server 22 may also need to close out any historical entries associated with the previous user (e.g., the previous profile 56). Again, the server 22 may itself determine the new ownership 28, or the server 22 may be informed of the new ownership 28 (perhaps by the electronic ownership message 70 illustrated in FIGS. 3-5). The server 22 may then require that the new user/owner complete the new registration procedure 132 to establish the new owner profile 130. The server 22 may then close out or stop adding new physiological data 102 to the historical usage 46 associated with the previous profile 56. The server 22 may thus begin logging and tracking the freshest physiological data 102 (after the date 72 and time) in the new repository 134 associated with the new owner profile 130. The server 22, then, may still retain the historical usage 46 associated with the previous profile 56.

Figure 8:
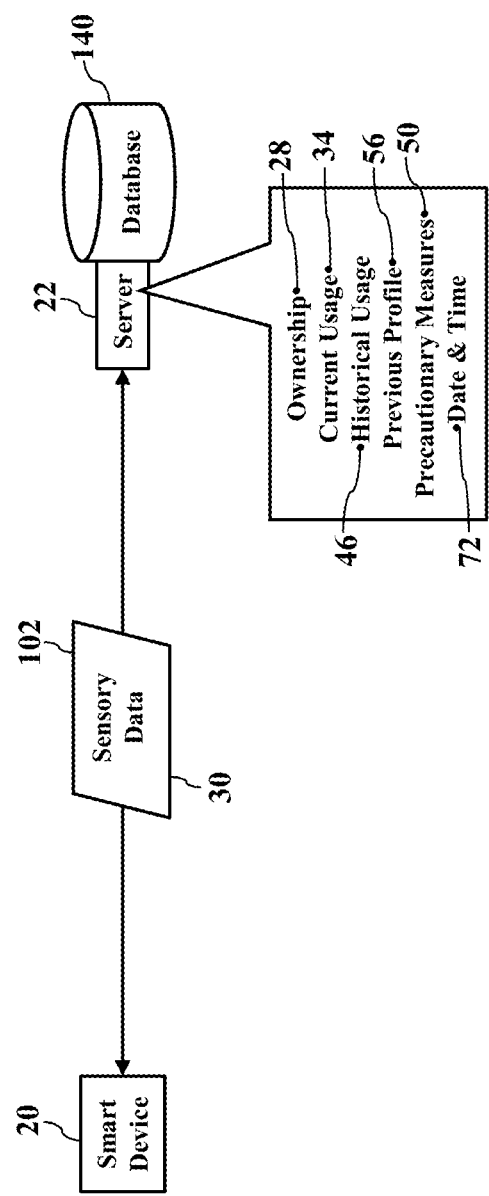

FIG. 8 illustrates cloud-based monitoring. Here exemplary embodiments may be applied to a distributed or cloud-based environment in which the smart device 20 and the server 22 collaborate to determine the ownership 28. The smart device 20, for example, may generate and send the sensory data 30 (such as the physiological data 102) to the remote server 22 (via the communications network 24 illustrated in FIGS. 1-5) for logging, analysis, and other services. The sensory data 30 is added as one or more entries to an electronic database 140. The electronic database 140 may be a central repository for the sensory data 30 collected by one or more smart devices 20. When the new ownership 28 is determined, exemplary embodiments may implement the precautionary measures 50 to reduce or prevent disclosure of sensitive or private information (such as the physiological data 102). The server 22, for example, may close or halt remote collection or monitoring of the physiological data 102 as of the date 72 and time associated with the new ownership 28. New or cumulative database entries associated with the previous profile 56 may be impermissible. Moreover, as the re-authentication procedure 52 may have failed (as earlier explained with reference to FIGS. 1-3), the electronic database 140 may be inaccessible to the smart device 20. That is, any database queries associated with the smart device 20 may deliberately fail or be ignored, thus further ensuring privacy of the physiological data 102.

Figure 9:
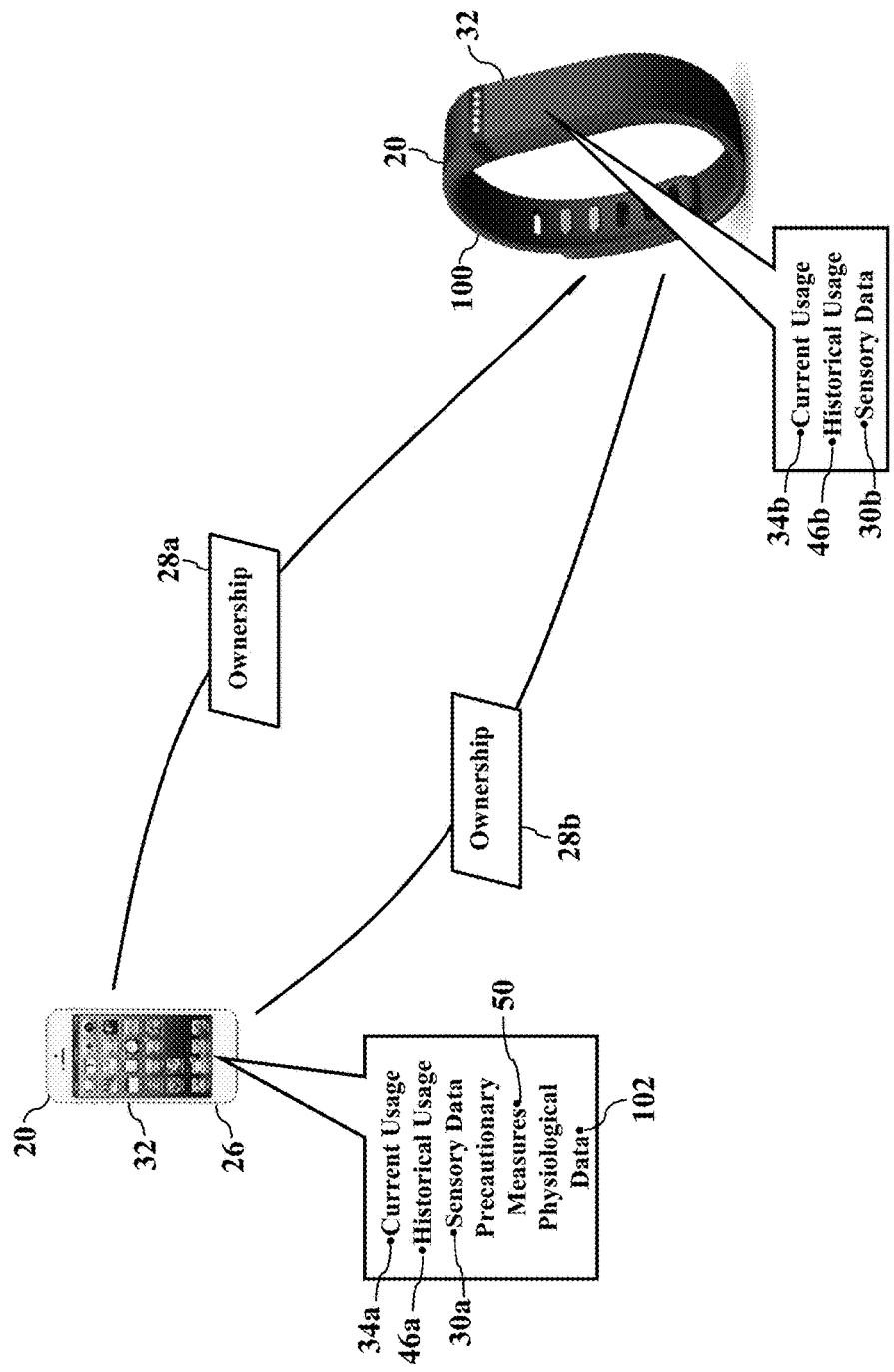

FIG. 9 illustrates sharable ownership 28. Here multiple smart devices 20 may estimate and share their individual ownership 28. Suppose, for example, the smartphone 26 determines its ownership 28a based on its current usage 34a and its historical usage 46a. The fitness monitor 100 also determines its corresponding ownership 28b based on its current usage 34b and its historical usage 46b. The smartphone 26 and the fitness monitor 100 may thus interface and share, or communicate, their respective ownerships 28a and 28b. The smartphone 26 may thus send its ownership 28a to the fitness monitor 100, and the fitness monitor 100 may send its ownership 28b to the smartphone 26. The ownerships 28a and 28b may thus be compared to determine a common ownership 28 or even a different ownership 28. For example, when the ownerships 28a and 28b match or are substantially identical, the smartphone 26 and the fitness monitor 100 may fully cooperate and share their respective sensory data (illustrated as reference numerals 30a and 30b) under common ownership 28.

New ownership 28, though, may require the precautionary measures 50. Suppose the ownerships 28a and 28b do not match. If the ownership 28b of the fitness monitor 100 changes, the smartphone 26 may implement the precautionary measures 50. The smartphone 26, in other words, may change its operation in response to the new ownership 28b reported by the fitness monitor 100. As one example, the smartphone 26 may sever communication with the fitness monitor 100 to ensure the privacy of any locally stored data or information (such as the physiological data 102). The smartphone 26 may thus disassociate itself from the fitness monitor 100, as common ownership 28 ended. The smartphone 26 may be forbidden to share or reveal its sensory data 30a to protect privacy.

Figure 10:
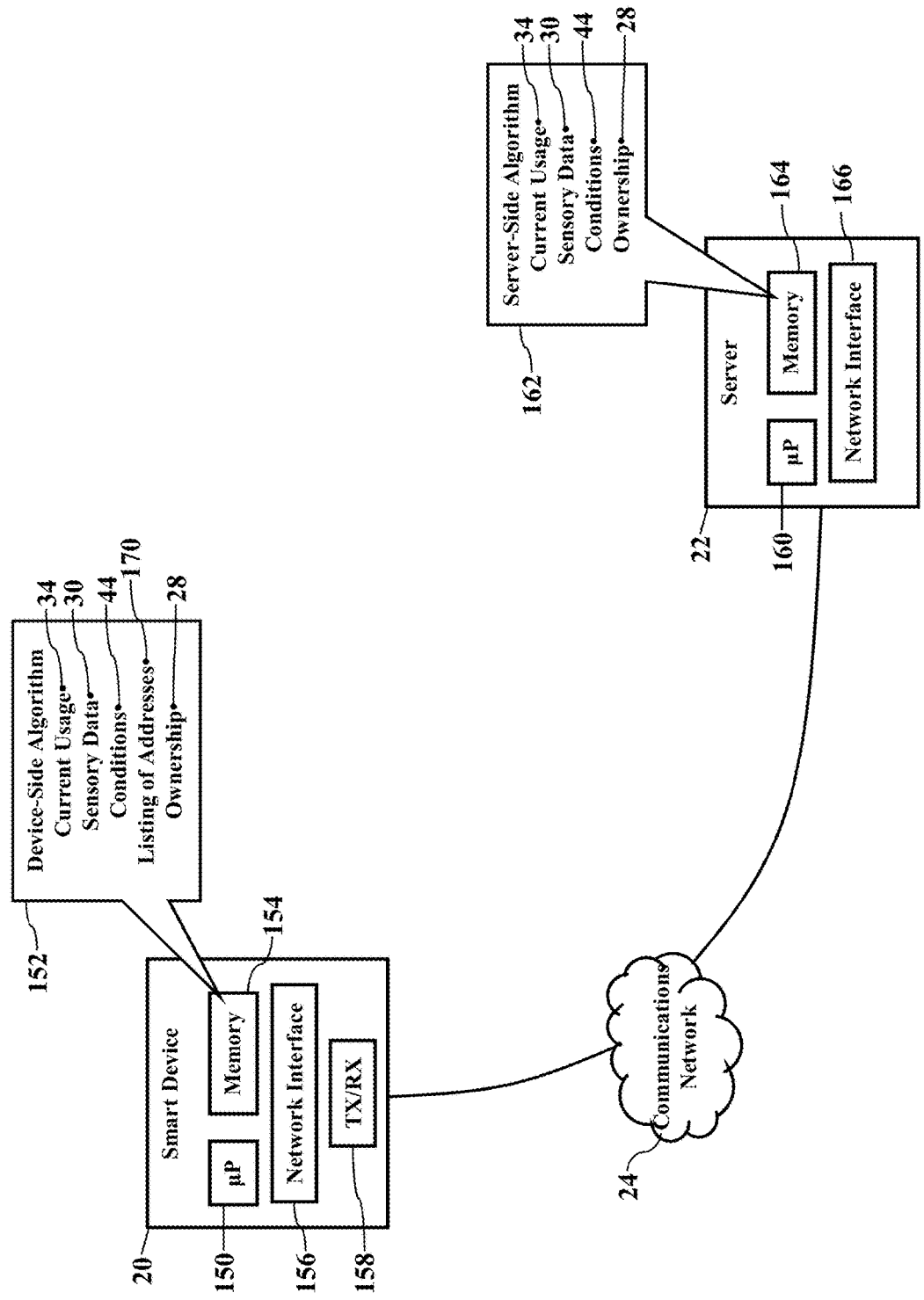
FIG. 10 is a more detailed block diagram illustrating the operating environment, according to exemplary embodiments.

FIG. 10 is a more detailed block diagram illustrating the operating environment, according to exemplary embodiments. The smart device 20 communicates with the server 22 via the communications network 24. The smart device 20 has a processor 150 (e.g., "μP"), application specific integrated circuit (ASIC), or other component that executes a device-side algorithm 152 stored in a local memory 154. The smart device 20 may also have a network interface 156 to the communications network 24. The server 22 has a processor 160 (e.g., "μP"), application specific integrated circuit (ASIC), or other component that executes a server-side algorithm 162 stored in a local memory 164. The server 22 may also have a network interface 166 to the communications network 24. The device-side algorithm 152 instructs the processor 150 to perform operations, such as determining the current usage 34 based on the sensory data 30 and/or the conditions 44. The device-side algorithm 152 may additionally or alternatively instruct the processor 150 to share the sensory data 30, the conditions 44, and/or the current usage 34. The device-side algorithm 152 may retrieve a listing 170 of network addresses to which the sensory data 30, the conditions 44, and/or the current usage 34 is shared. The device-side algorithm 152 may thus instruct the processor 150 to send or route any data or information to any entry in the listing 170 of network addresses. For example, the smart device 20 may send the sensory data 30, the conditions 44, and/or the current usage 34 to a network address associated with the server 22. The device-side algorithm 152 and the server-side algorithm 162 may thus individually or cooperatively determine the ownership 28 associated with the smart device 20.

The smart device 20 may also include or access a transceiver 158. The smart device 20 may thus be capable of transmitting and/or receiving signals to or from the communications network 24. The smart device 20 may call or invoke its network interface 156 to establish communication with the communications network 24. While the communications network 24 is preferably a wireless local area network, the communications network 24 may be any wired or wireless network (such as a cellular data network, as later paragraphs will explain).

Exemplary embodiments may packetize. The network interfaces 156 and 166 and/or the transceiver 158 may packetize communications or messages into packets of data according to a packet protocol, such as the Internet Protocol. The packets of data contain bits or bytes of data describing the contents, or payload, of a message. A header of each packet of data may contain routing information identifying an origination address and/or a destination address. There are many different known packet protocols, and the Internet Protocol is widely used, so no detailed explanation is needed.

Exemplary embodiments may be applied regardless of networking environment. Exemplary embodiments may be easily adapted to stationary or mobile devices having cellular, WI-FI®, near field, and/or BLUETOOTH® capability. Exemplary embodiments may be applied to mobile devices utilizing any portion of the electromagnetic spectrum and any signaling standard (such as the IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the "World Wide Web"), an intranet, a local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

Exemplary embodiments may utilize any processing component, configuration, or system. Any processor could be multiple processors, which could include distributed processors or parallel processors in a single machine or multiple machines. The processor can be used in supporting a virtual processing environment. The processor could include a state machine, application specific integrated circuit (ASIC), programmable gate array (PGA) including a Field PGA, or state machine. When any of the processors execute instructions to perform "operations", this could include the processor performing the operations directly and/or facilitating, directing, or cooperating with another device or component to perform the operations.

Figure 11:
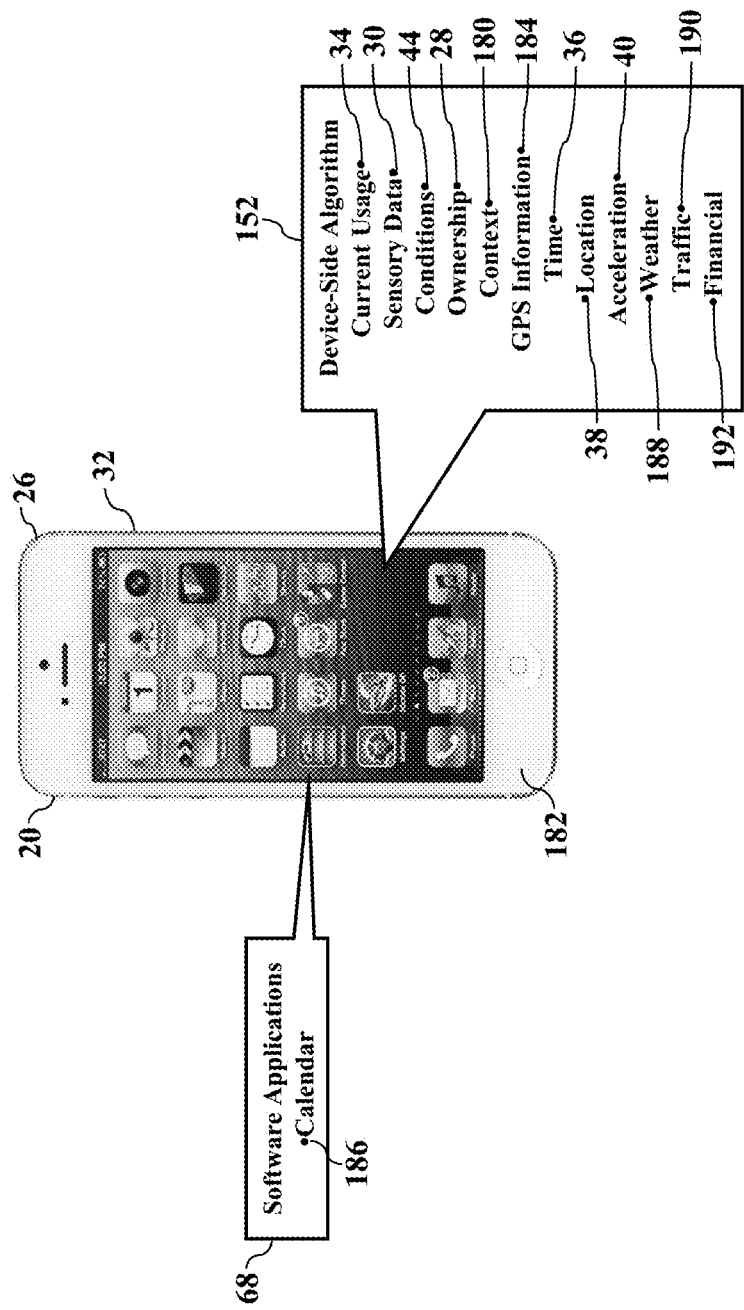
FIGS. 11-12 illustrate contextual determination, according to exemplary embodiments.
Figure 12:
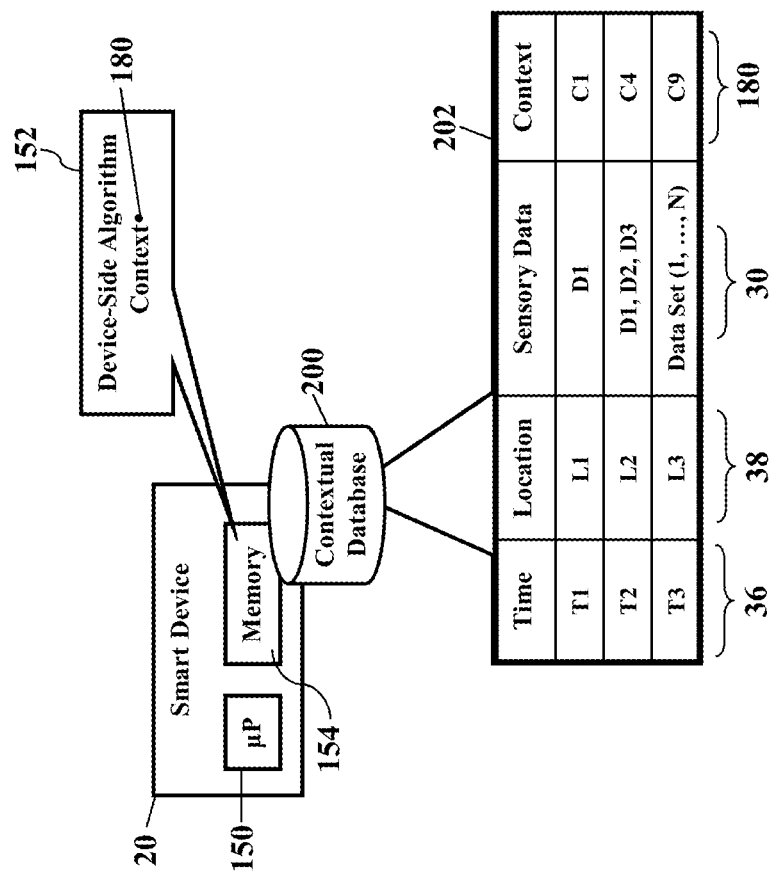

FIGS. 11-12 illustrate contextual determination, according to exemplary embodiments. As the smart device 20 operates, its current usage 34 may be related to context 180. FIG. 11 again illustrates the smart device 20 as the smartphone 26, which again most people are assumed familiar. As the user carries and uses the smartphone 26, exemplary embodiments may determine the context 180, which relates to the current usage 34. Contextual determination is well known, so this disclosure need not provide a detailed explanation. Suffice it to say that the context 180 may be determined from any information source. The context 180, for example, may be determined from the sensory data 30 sensed by the sensor(s) 32. The smartphone 26, as a familiar example, may have a global positioning system ("GPS") transceiver 182 that determines GPS information 184. The smartphone 26 may thus determine the current time 36 of day and its current location 38 using the GPS transceiver 182. The location 38, however, may be alternatively determined from network or WIFI® access points, network identifiers, and/or any known method. The context 180 may also utilize any information or data associated with the software applications 68 (such as one or more entries in an electronic calendar application 186). As another example, an accelerometer may provide measurements or signals representing the acceleration 40. Other sensors may provide information indicating temperature, altitude, pressure, humidity, and any other ambient condition.

The context 180 may include other information. For example, databases may be queried for weather data 188 and traffic data 190 related to the location 38. Emergency information may also be retrieved for the location 46, plus demographic information associated with the user and/or the location 38. Financial information 192 associated with the user and/or the location 38 (such as stock prices and portfolio balances) may be retrieved. The context 180 may also be augmented with usage information describing any other software applications 68 executed by the smartphone 26 (such as texting apps, email apps, a web browser, and social apps).

FIG. 12 illustrates database 200 of contexts, according to exemplary embodiments. As the reader may realize, there may be many different combinations of information that define many different contexts 180. Exemplary embodiments may thus consult the electronic database 200 of contexts when determining the context 180. The database 200 of contexts is illustrated as being locally stored in the memory 154 of the smart device 20, but the database 200 of contexts may be remotely stored and accessed from any network location (such as the server 22 illustrated in FIG. 10). FIG. 12 illustrates the database 200 of contexts as a table 202 having electronic database associations between different contexts 180 and their constituent or component values. There may be several or even hundreds of different components for each context 180. For simplicity, then, FIG. 12 only illustrates the time 36, the location 38, and the sensory data 30 that defines each different context 180. Once the constituent or component values are retrieved (as explained with reference to FIG. 11), the database 200 of contexts may be queried for the corresponding context 180. While FIG. 12 only illustrates a few different contexts 180, in practice the database 200 of contexts likely contains many entries defining a full and rich variety of contexts 180, perhaps including hierarchically defined sub-tiers or levels.

Figure 13:
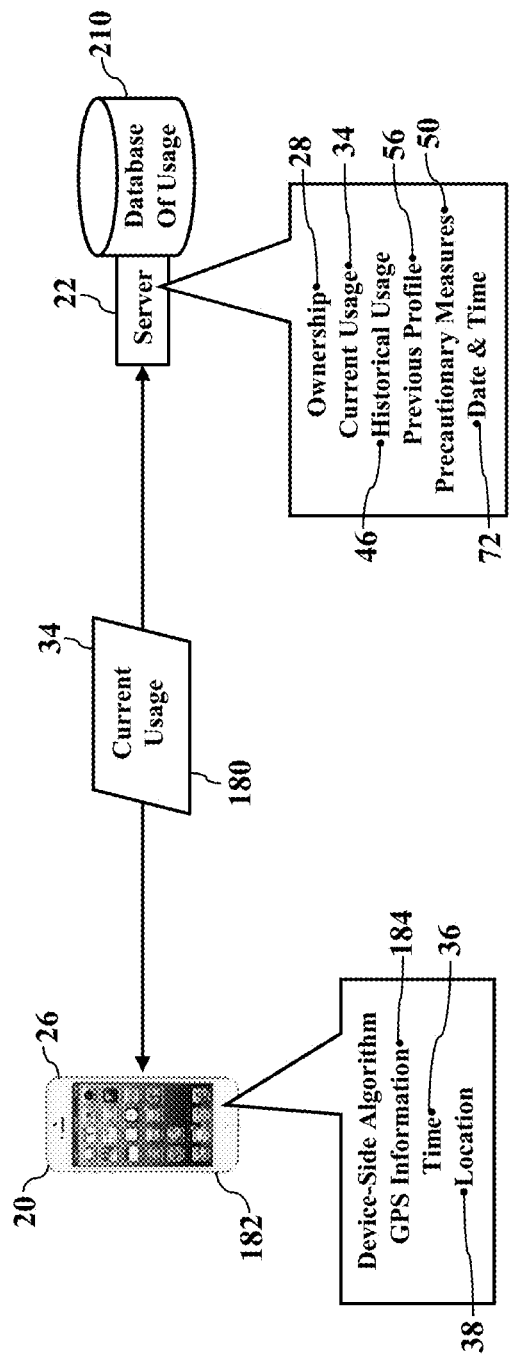
FIGS. 13-14 illustrate historical usage, according to exemplary embodiments.
Figure 14:
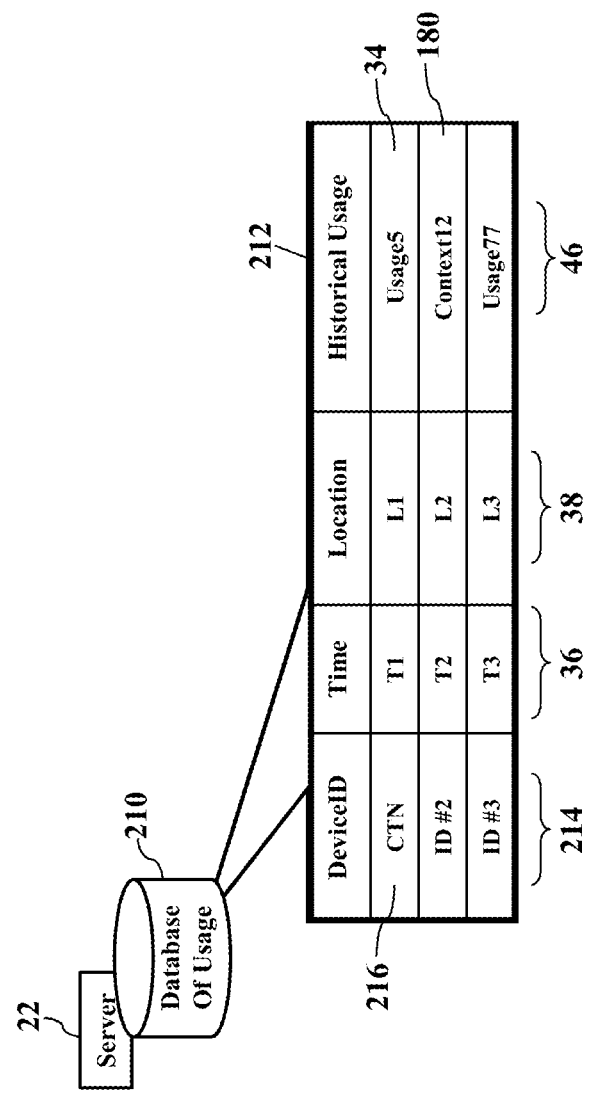

FIGS. 13-14 illustrate the historical usage 46, according to exemplary embodiments. As the reader may understand, most people are creatures of habit. We eat and sleep according to routines. We mostly travel the same roads to/from home, work, and school. So, once the current usage 34 is determined (as above explained), exemplary embodiments may compare to historical observation. If the user's habitual, historical usage 46 fails to match the current usage 34, then perhaps the ownership 28 of the smart device 20 (e.g., the smartphone 26) has changed.

An electronic database 210 of usage may be consulted. The electronic database 210 of usage tracks historical usage of the smart device 20 (such as the smartphone 26). The electronic database 210 of usage may store entries related to usage at different times of days and/or at different locations. Whenever the smartphone 26, for example, reports its current location 38 (such as the GPS information 184 determined by the GPS transceiver 182), exemplary embodiments may query the database 210 of usage for historical usage at that same location. The database 210 of usage may thus log each time 36, location 38, and current context 180 reported by the smartphone 26. In other words, as the smartphone 26 is carried and moved, its current usage 34 is timestamped and logged in the database 210 of usage. FIG. 13 illustrates the database 210 of usage as being remotely stored within the server 22, but any or all of the database entries may be locally stored within the smartphone 26. Regardless, FIG. 14 illustrates the database 210 of usage as a table 212 that electronically maps, relates, or associates a device identifier 214 to different usage reports. That is, each time the smartphone 26 reports its current usage 34, the database 210 of usage may add an entry for the unique device identifier (or "DeviceID") 214 assigned to or associated with the smartphone 26. While the device identifier 214 may be a serial number or any alphanumeric combination, the device identifier 214 may be a cellular identifier 216. Whenever the smartphone 26 sends messages or information, the smartphone 26 may include or self-report its cellular telephone number (or "CTN"), International Mobile Subscriber Identity (or "IMSI"), or Mobile Station International Subscriber Directory Number ("MSISDN"). The database 210 of usage may thus have electronic database associations between different device identifiers 214, different timestamps (e.g., the time 36), different locations 38, and different usages 34 reported by smart devices 20. Over time, then, the database 210 of usage may store long-term records of the usage 34 and movements of the smartphone 26.

Historical comparisons may be made. Exemplary embodiments may query the database 210 of usage for any search terms and retrieve matching historical entries. The server 22, as an example, may query for entries associated with the device identifier 214 (perhaps the cellular identifier 216), the time 36, and/or the location 38. The server 22 may thus retrieve the historical usage 46 having electronic database association with the time 36 and/or the location 38, as simple examples. In general, though, the server 22 may query for any information or data describing the context 180 and/or the current usage 34. The server 22 may thus retrieve the historical usage 46 that matches the query term(s).

Figure 15:
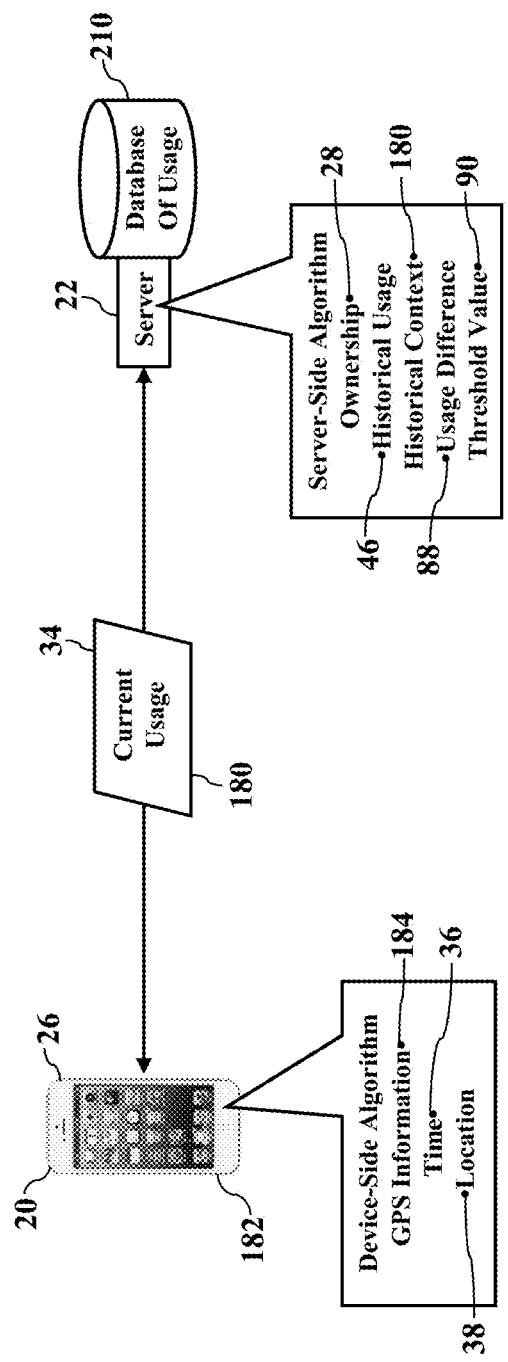
FIG. 15 illustrates ownership, according to exemplary embodiments.

FIG. 15 illustrates the ownership 28, according to exemplary embodiments. Once the current usage 34 and the historical usage 46 (perhaps at the same time 36 and location 38) are determined, comparisons may be made. The information, data, and/or values describing the current context 180, for example, may be compared to the historical context 180. Any usage difference 88 may then be compared to the threshold value 90. The threshold value 90 may be a configurable parameter that, when satisfied, determines the new ownership 28. For example, if the usage difference 88 equals or exceeds the threshold value 90, exemplary embodiments may assume or infer the ownership 28 has changed.

Usage may thus indicate the ownership 28. As the database 210 of usage grows, recurring patterns of use are logged. As the smart device 20 moves and operates, habitual work, home, and travel usage patterns emerge. The context 180 thus reveals repeated shopping, business, entertainment, and leisure activities. The same routes are traveled, the same email/text contact addresses are observed, and the same software applications are executed. In plain words, if the current usage 34 matches historical observance, the ownership 28 has not likely changed. However, if the current usage 34 fails to match the historical usage 46, new ownership 28 may be inferred.

Figure 16:
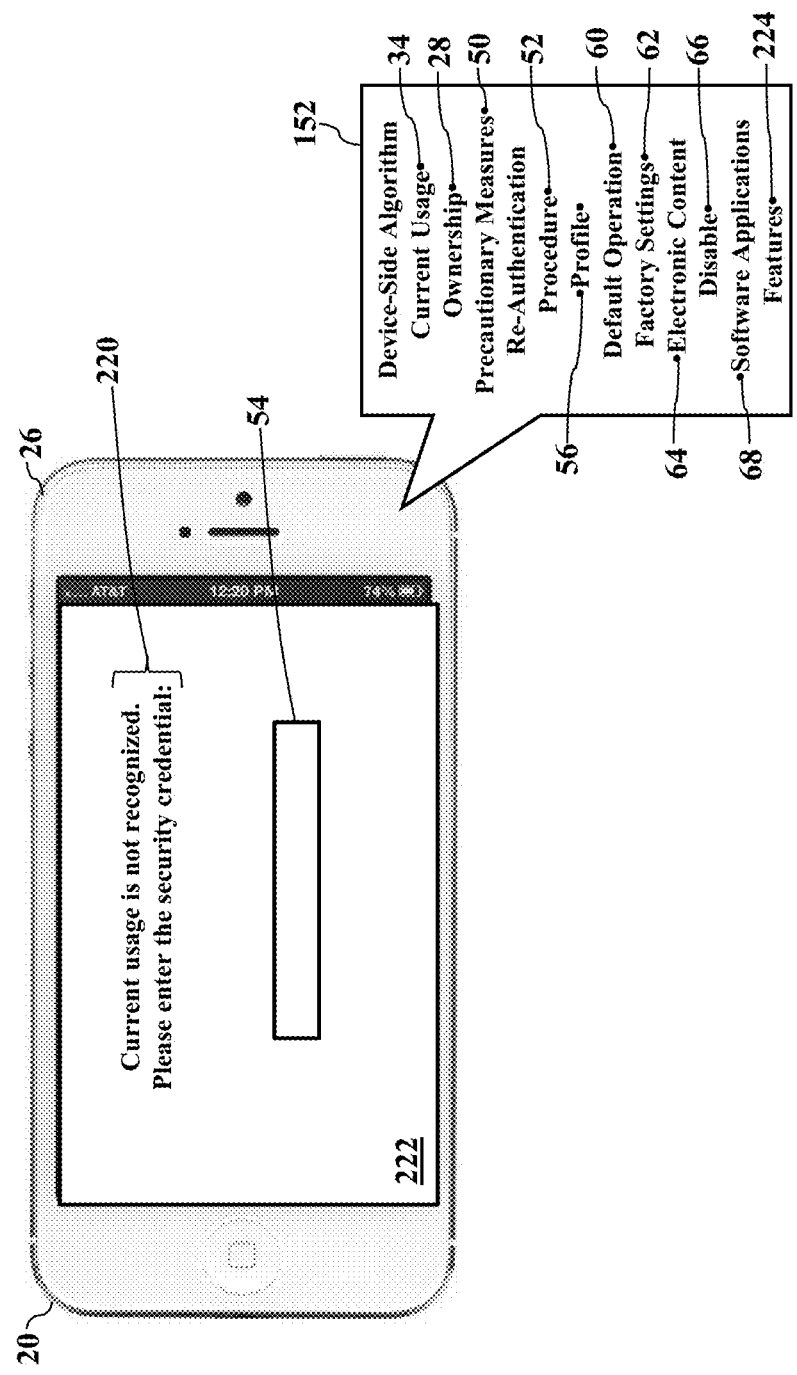
FIG. 16 illustrates precautionary measures, according to exemplary embodiments.

FIG. 16 illustrates the precautionary measures 50, according to exemplary embodiments. When the current usage 34 indicates that the ownership 28 may have changed, the re-authentication procedure 52 may be performed. The device-side algorithm 152, for example, may cause the smartphone 26 to generate a prompt 220 for display on its display device 222. The prompt 220 instructs the user to input the existing or recognized security credential(s) 54 (such as a username, password, spoken phrase, or fingerprint). If the security credential 54 matches a requirement of the existing profile 56 that was previously or is already associated with the smartphone 26, then perhaps the ownership 28 has not changed. The user, in other words, may be legitimate.

The default operation 60, however, may be required. If the current user cannot make an input that matches the stored security credential 54, then the current user may be a new owner or even an illegitimate possessor. Regardless, new ownership 28 may be presumed to protect potentially personal or private information. The device-side algorithm 152 may thus implement the additional precautionary measures 50, such as reverting to the factory settings 62. The device-side algorithm 152 may also limit or even deny access and/or retrieval of any stored data or information (such as photos, contacts, videos, voicemails, text messages, and any other electronic content 64). The device-side algorithm 152 may also disable 66 any software applications 68 and/or features 224 that may have access to private and sensitive information. Games, streaming services, and financial services are just some applications or features that may be disabled to protect private and sensitive information.

Figure 17:
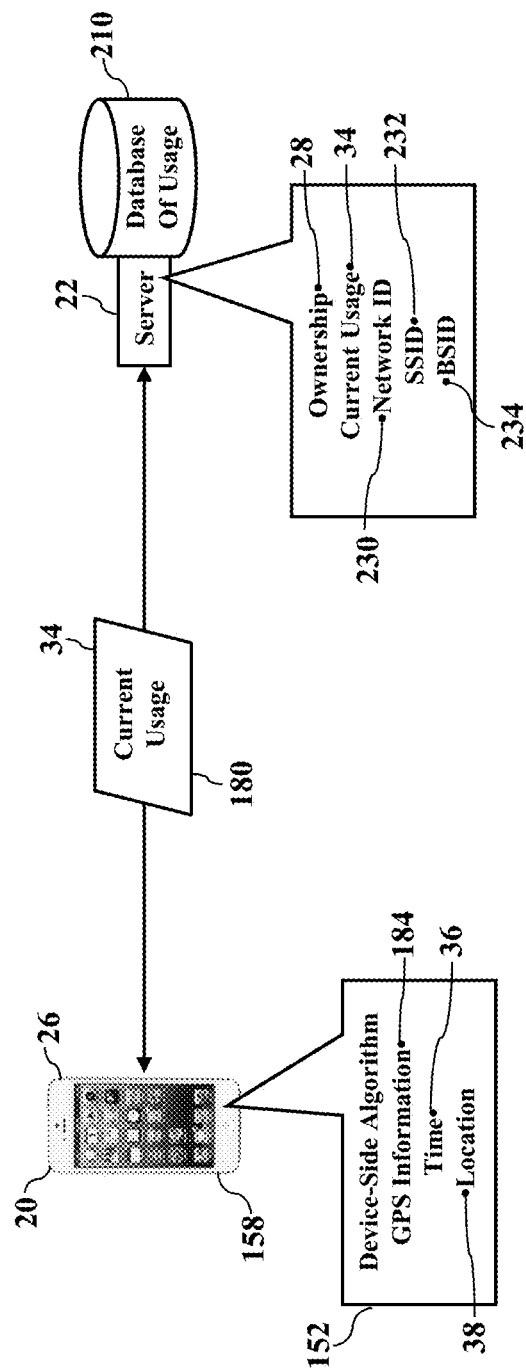
FIGS. 17-19 illustrate network-based ownership, according to exemplary embodiments.
Figure 18:
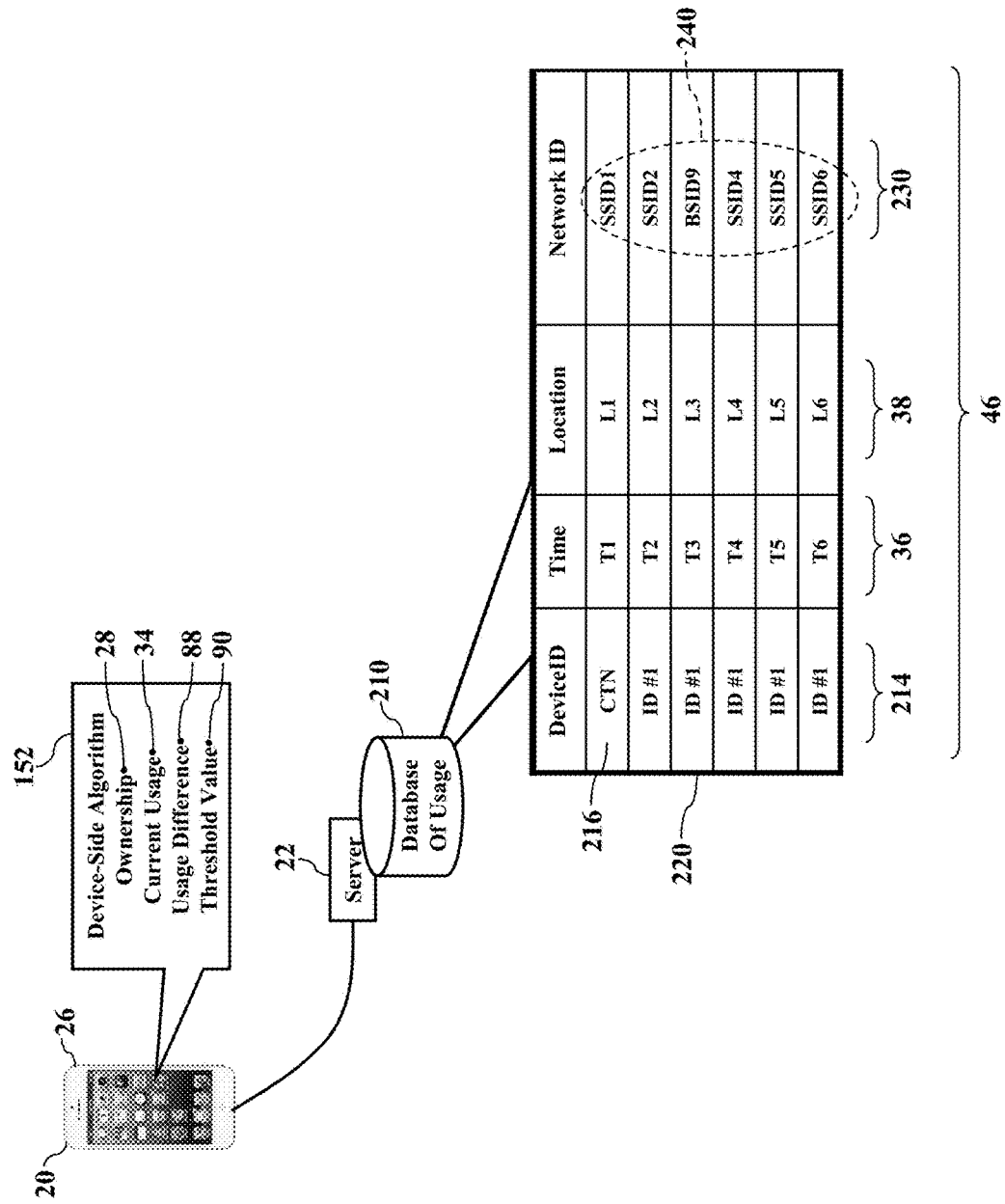
Figure 19:
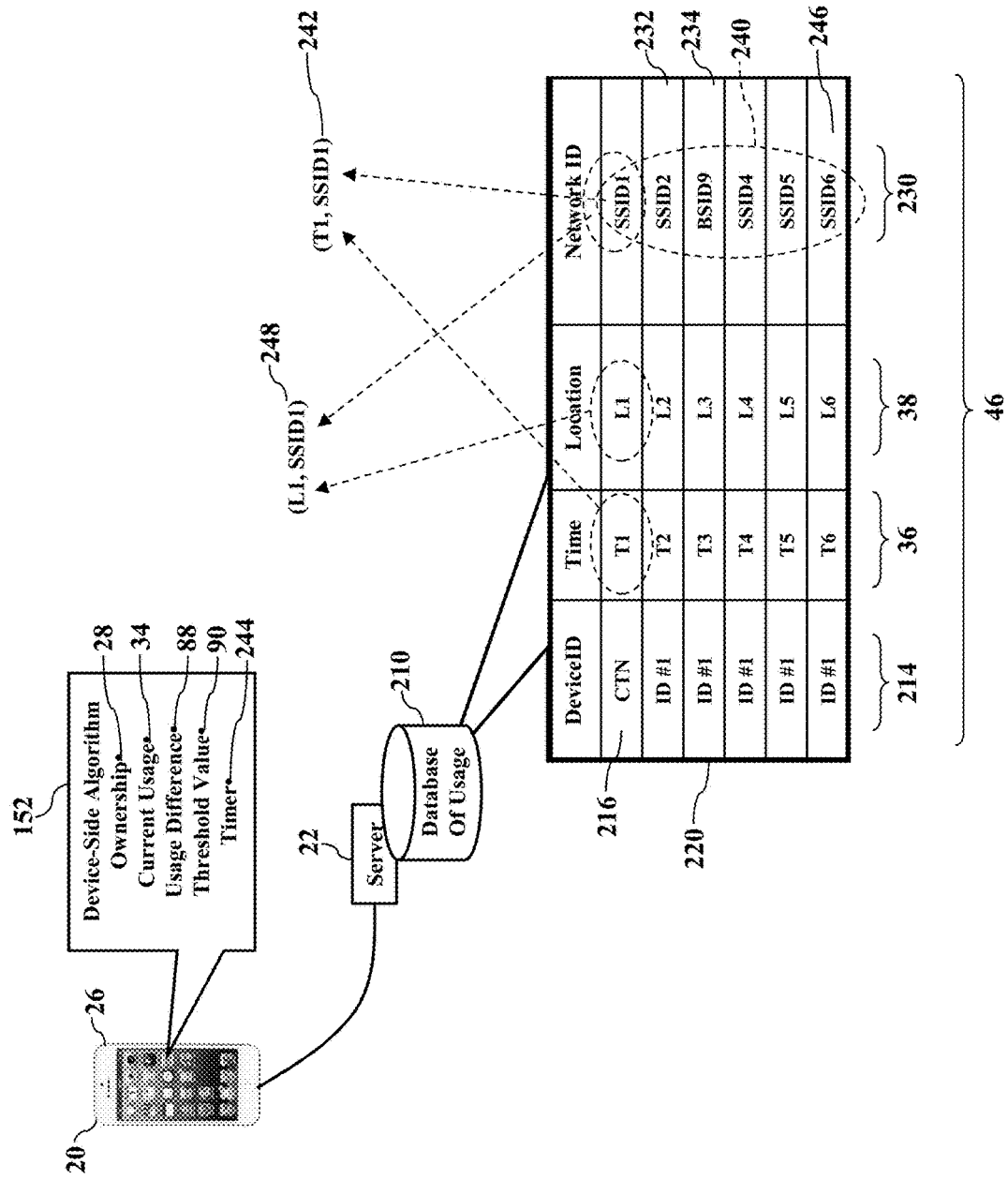

FIGS. 17-19 illustrate network-based ownership, according to exemplary embodiments. Here, historical observances of wireless detections may be used to infer the ownership 28. Again, as the reader likely understands, the smart device 20 (such as the smartphone 26) may have wireless capabilities (perhaps using the transceiver 158). While exemplary embodiments may be applied to any wireless standard or technology, wide area cellular and wireless WIFI® local area networks are perhaps best known to most readers. So, when the smartphone 26 operates, the smartphone 26 may request access or permission to a wide area cellular network or a wireless local area (WI-FI)® network serving any area or geographic location. The database 210 of usage may thus include additional electronic database associations that track or log a corresponding network identifier (or "Network ID") 230. That is, any time the smartphone 26 reports its current time 36, location 38, and other information related to its current usage 34, the smartphone 26 may also report the network identifier 230 that uniquely identifies the cellular or WI-FI® network. For example, the database 210 of usage may add an entry for a service set identifier ("SSID") 232 associated with a wireless local area network. An entry may also be added for a base station identifier ("BSID") 234 associated with a cellular base station. Regardless, over time the database 210 of usage reveals a comprehensive long-term central repository of network access requested by the smartphone 26.

The ownership 28 may be determined. Once the current usage 34 is known, historical comparisons may be made. Suppose the current context 180 is determined using the time 36, the location 38, and/or the network identifier 230 reported by the smartphone 26. Exemplary embodiments may then query the database 210 of usage and retrieve the corresponding historical usage 46. The current usage 34 may be compared to the historical usage 46 to determine the usage difference 88. If the usage difference 88 exceeds the threshold value 90, then exemplary embodiments may assume or infer the ownership 28 has changed. Suppose the smartphone 26 reports the current time 36, its current location 38, and the network identifier 230 that matches a historical observance for a previous date/time at the same location. That is, the smartphone 26 is accessing the same wireless network (identified by the network identifier 230) that matches a previous report for the same or similar time and location. Exemplary embodiments may thus infer that the ownership 28 has not changed, as the smartphone 26 is operating as historically observed.

FIG. 18 illustrates sequential network recognition. Here exemplary embodiments may use sequential network reports to determine the ownership 28. As the smartphone 26 moves, the smartphone 26 may encounter and request access to different radio/cellular and WIFI® networks. FIG. 18 thus illustrates the historical usage 46 as sequential network identifiers 230 previously reported by the smartphone 26. That is, the database 210 of usage reveals a historical series 240 of the network identifiers 230 that have been previously reported in electronic database association with the time 36 and location 38. Assume, for example, that the user carries the smartphone 26 while roaming a shopping center. As the user enters and exits different stores, the smartphone 26 may wirelessly encounter different wireless networks serving different stores, floors, and other areas. As the smartphone 26 moved (e.g., the time 36 and location 38), the smartphone 26 also reported the network identifier 230 associated with the wireless network providing wireless access or service. The device-side algorithm 152 may thus cause the smartphone 26 to report these different and sequential network identifiers 230 to the database 210 of usage. Exemplary embodiments may compare the currently reported network identifier 230 to the historical series 240 of the network identifiers 230. If the network identifier 230 matches one of the historical entries at the same similar time 36 of day and/or location 38, then exemplary embodiments may conclude that the smartphone 26 is on track and proceeding as historically observed. Ownership 28, in other words, has not changed.

Deviation, though, may indicate new ownership 28. Suppose the smartphone 26 begins reporting network identifiers 230 that do not match one or more of the historical entries in the database 210 of usage. The current usage 34 (perhaps as determined by at least the currently reported SSID 232) thus fails to match the historical usage 46 (as determined by the historical series 240 of the network identifiers 230). At some time 36 or location 38 the usage difference 88 thus indicates the ownership 28 has changed. The threshold value 90, for example, may be a numerical number of variations in the historical series 240 of the network identifiers 230. That is, the smartphone 26 may be permitted to deviate from the historical usage 46 for a predetermined time and/or distance, as long as the smartphone 26 returns to the historical usage 46. The smartphone 26, in other words, may report one or even several strange or out-of-sequence network identifiers 230. If the smartphone 26 afterwards resumes historical movements (such as by reporting matching network identifiers 230 according to historical observance), then even a prolonged detour (e.g., vacation) may indicate the ownership 28 has not changed. However, if the smartphone 26 never reports historical network identifiers 230, then exemplary embodiments may assume the ownership 28 has changed. The threshold value 90 may thus be configured for a short term or a longer term deviation, depending on the user's desires and/or a network operator's policy.

FIG. 19 illustrates timing requirements. Notice that the entries in the database 210 of usage reveal networking timing pairs 242 of values. That is, the database 210 of usage stores a (time/SSID) pairing 242 of values associated with each successive wireless network. As the smartphone 26 moves, exemplary embodiments may monitor a speed or time of movement. Each report of the current usage 34 may be time stamped that marks a time of requested access to the corresponding wireless network (as identified by the SSID 232 or BSID 234). As the reported network identifier 230 is compared to the database entries, strict or lax adherence may be required. A timer 244, for example, may be initialized with each report of the current usage 34. The timer 244 counts up or down to a final value at a receipt of a next current usage 34 reported by the same smartphone 26 (e.g., the device identifier 214). The timer 244 may thus count a time in seconds or minutes between successive reports. So, not only must each sequential SSID 232 match a historical report, but exemplary embodiments may also require timing compliance between the successive reports. Exemplary embodiments may thus compare a current value of the timer 244 to the time 36 associated with a next corresponding report in the historical series 240 of the network identifiers 230. If the current value of the timer 244 is less than or equal to a timing difference between successive entries, then exemplary embodiments may conclude that the smartphone 26 is moving on time and as historically observed to some final destination location (as identified by a final entry 246 in the historical series 240 of the network identifiers 230). However, if the current value of the timer 244 exceeds the timing difference between successive entries, exemplary embodiments may conclude that the smartphone 26 has strayed from historical observance and the ownership 28 may have changed.

A locational pair 248 may also be used. The reader may also notice that the entries in the database 210 of usage reveal networking locational pairs 248 of values. That is, the database 210 of usage stores a (location/SSID) pairing 248 of values associated with each successive wireless network. As the smartphone 26 moves, exemplary embodiments may monitor the location 38 of the corresponding wireless network (as identified by the SSID 232 or BSID 234). As the reported network identifier 230 is compared to the database entries, strict or lax locational adherence may be required. If the location 38 and/or the network identifier 230 generally matches an historical observance, then exemplary embodiments may conclude that the smartphone 26 is moving as historically observed to the final destination location (as identified by the final entry 246 in the historical series 240 of the network identifiers 230). However, if the location 38 and/or the network identifier 230 fails to match historical observance, exemplary embodiments may conclude that the smartphone 26 has strayed and the ownership 28 may have changed.

Figure 20:
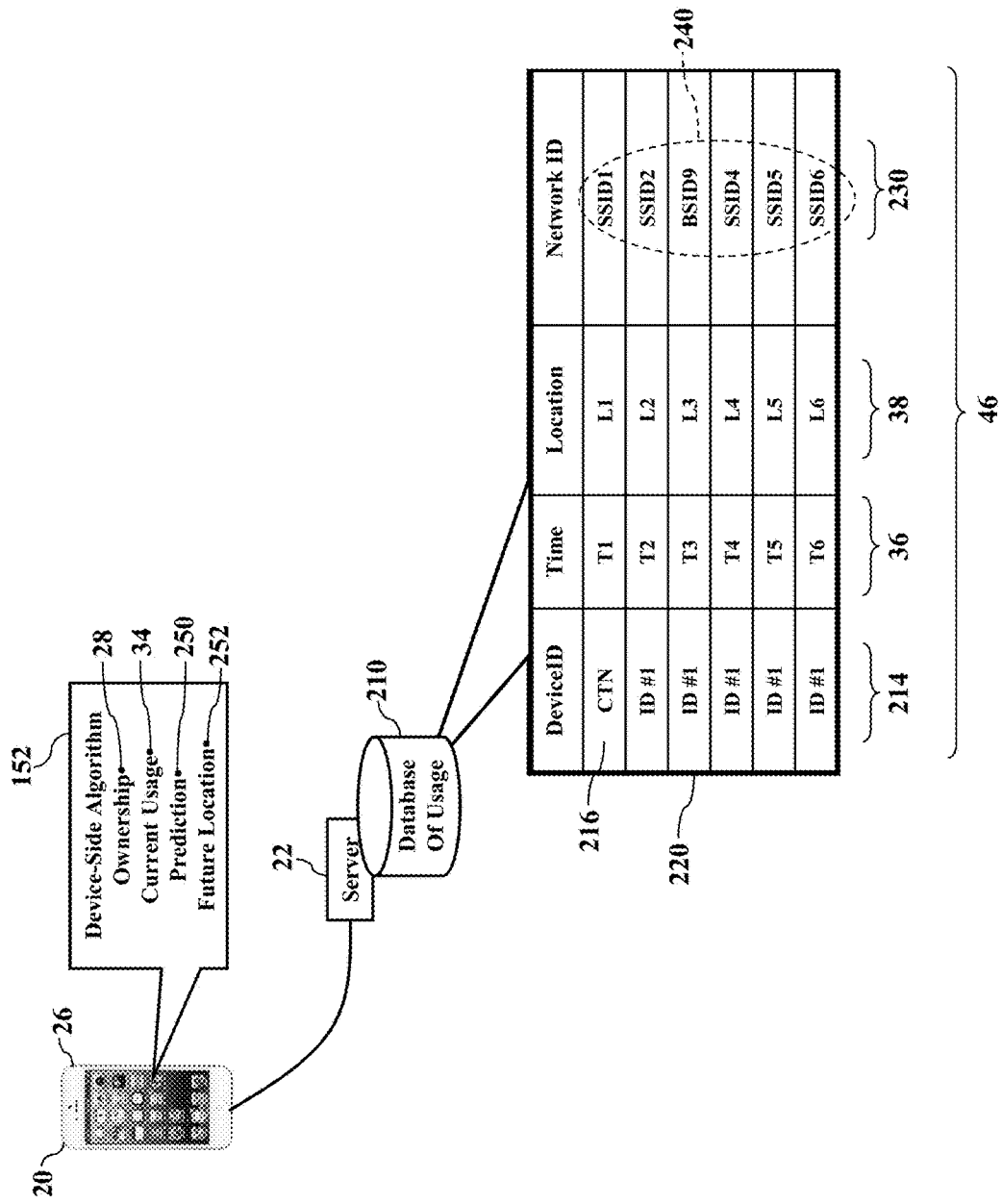
FIG. 20 illustrates locational prediction, according to exemplary embodiments.

FIG. 20 illustrates locational prediction, according to exemplary embodiments. Here the ownership 28 may be confirmed based on predicted locations. Whenever the smartphone 26 reports its current usage 34, exemplary embodiments may generate a network prediction 250 based on historical reports. For example, whenever the smartphone 26 reports its current usage 34, exemplary embodiments may query for a series or sequence of historical entries having about the same location 38 and/or the same time 36 currently reported by the smartphone 26. If the current usage 34 matches one or more historical entries, then exemplary embodiments may infer that the smartphone 26 is moving along a path historically observed. That is, the smartphone 26 is being carried along a familiar route to a historical destination previously logged in the database 210 of usage. In other words, if a recent string or sequence of locational reports matches some sequence of historical entries, then exemplary embodiments may conclude that the smartphone 26 is traveling along the same route to the same future location 252. As a simple example, if the smartphone's most recent five (5) usage reports match some historical observance in the database 210 of usage, then exemplary embodiments may predict the smartphone's future location 252 will match the next historical sixth ($6^{th}$) entry in the same historical sequence. As most people are creatures of habit, exemplary embodiments may predict the future location 252 and infer static, historical ownership 28 based on historical observances.

Figure 21:
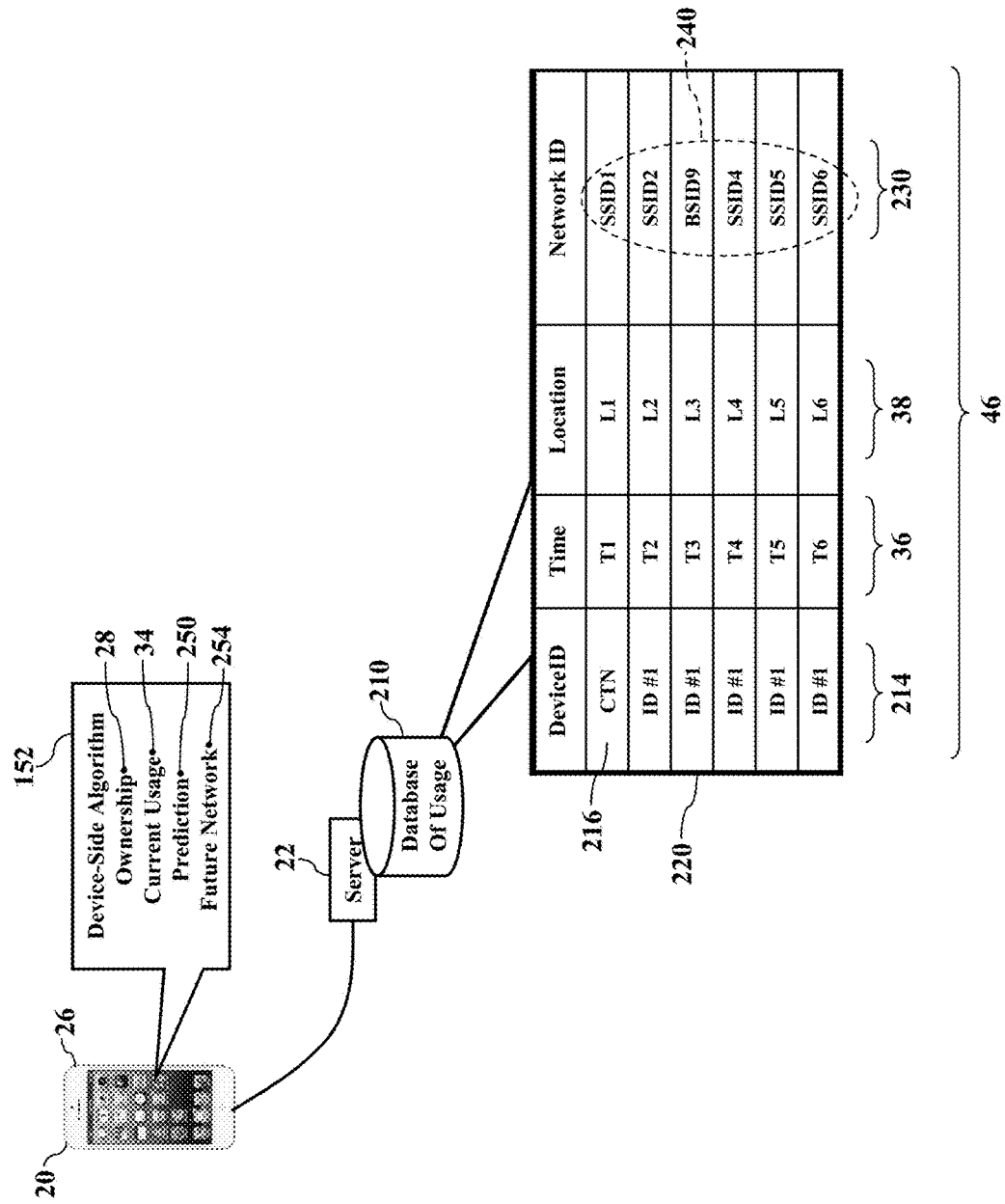
FIG. 21 illustrates network prediction, according to exemplary embodiments.

FIG. 21 illustrates network prediction, according to exemplary embodiments. As the database 210 of usage logs historical network usage, here exemplary embodiments may predict or infer a future network 254. Exemplary embodiments, in other words, may predict an upcoming network identifier 230, based on the historical entries in the database 210 of usage. If the prediction 250 is then later confirmed or reported, the smartphone 26 is moving as historically observed and the ownership 28 is confirmed. Exemplary embodiments may thus query the database 210 of usage for a series or sequence of entries having one or more matching network identifiers 230, the time 36, and/or the location 38. For example, if one or more usage reports match one or more historical entries, then the smartphone 26 is requesting network access along a path historically observed. In other words, if a recent string or sequence of the network identifiers 230 match the historical series 240 of the network identifiers 230, then the smartphone 26 is requesting wireless access as historically seen. Exemplary embodiments may thus predict or infer that the smartphone 26 will request access to a next entry historically observed in the same series. As FIG. 21 illustrates, if the current usage 34 reports the sequence 240 as "SSID1, SSID2, BSID9, SSID4," exemplary embodiments may retrieve the next entry in the same sequence 240 and predict that the smartphone 26 will next request access to "SSID5." Exemplary embodiments, in other words, may infer the future network 254 as the next entry in the matching historical series 240. If the prediction 250 is later confirmed by report, the historical ownership 28 is further confirmed.

Exemplary embodiments may track any networking details. This disclosure mainly explains cellular and WIFI® networking environments, as most people are familiar with these wireless technologies. Exemplary embodiments, though, may be adapted to any networking environment. For example, whenever the smart device 20 reports its current usage 34, the report may include any networking details. The smart device 20, for example, may report a radio frequency and/or a bitrate of the wireless connection or communication. The database 210 of usage may thus add entries additionally logging these details. For example, the radio frequency and/or bitrate may reveal whether the smart device 20 is operating at cellular frequencies, WIFI® frequencies, or BLUETOOTH® and near-field frequencies. As another example, when the smart device 20 participates in near-field communication, the smart device 20 may additionally or alternatively report an initiator device and a target device. The current usage 34 may also detail unique radio frequency identification tags and readers. Over time, then, the database 210 of usage contains historical entries detailing the near field and RFID transactions involving the smart device 20. If any current transaction matches some historical entry, exemplary embodiments may confirm the ownership 28 based on the match. However, the usage difference 88 may indicate new ownership 28.

Figure 22:
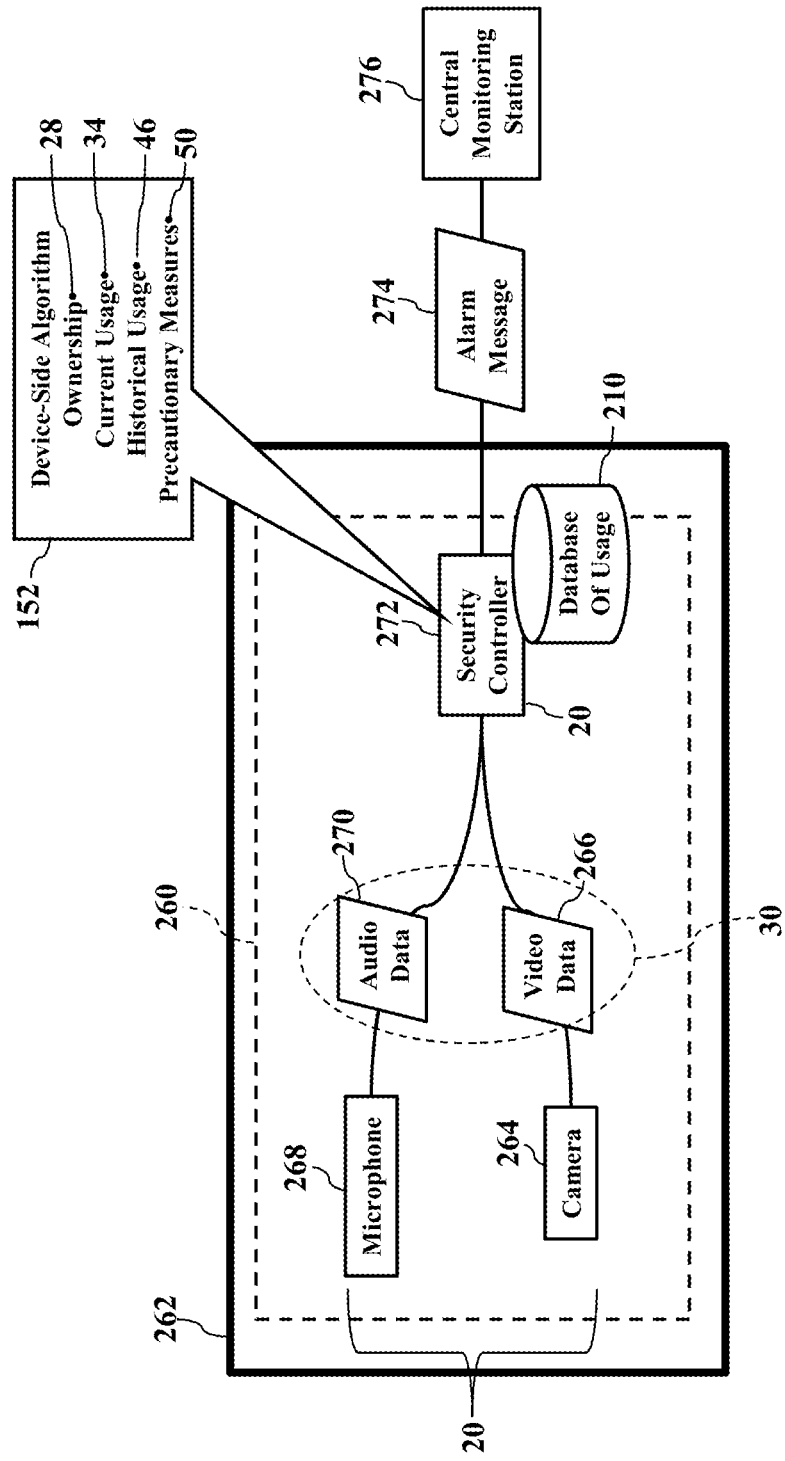
FIG. 22 illustrates a security system as still another exemplary operating environment, according to exemplary embodiments.

FIG. 22 illustrates still another exemplary operating environment, according to exemplary embodiments. Here exemplary embodiments may be applied to a security system 260 monitoring a building 262, such as a home or business. As the reader probably understands, the security system 260 may have many smart devices 20 that protect occupants from fire, intrusion, and other security conditions. For example, one of the smart devices 20 may be a wired or wireless camera 264 that captures video data 266. Another smart device 20 may be a microphone 268 that generates audio data 270. Other smart devices 20 (such as motion detectors, carbon monoxide and fire sensors, water sensors, and any other sensory devices) may also monitor areas of the building 262 and generate their respective sensory data 30.

Any of the smart devices 20 may send their sensory data 30 to another smart device 20, such as a security controller 272. If any smart device 20 measures or determines an abnormal or elevated sensory reading, the smart device 20 may notify the security controller 272. Regardless, the security controller 272 evaluates various logical rules and confirms an alarm indicating a fire, intrusion, or other security event. The security controller 272 may then send an alarm message 274 to alert of the alarm (such as notifying a central monitoring station 276, as is known). Emergency personnel may then be summoned.

The ownership 28 may be determined. Here the security controller 272 may store and execute the device-side algorithm 152 and determine when its ownership 28 has changed. As the security controller 272 monitors the sensory data 30, over time the security controller 272 will observe patterns in the historical usage 46. The database 210 of usage may thus be accessible to the security controller 272 to determine the ownership 28. The security controller 272 may thus report or log its current usage 34 and then compare to the historical usage 46. Over time the security controller 272 will observe and learn patterns of usage by day and time. However, if the security controller 272 begins observing/reporting the current usage 34 that differs from the historical usage 46, the ownership 28 may have changed (as this disclosure explains). The security controller 272 may implement the precautionary measures 50 (again as earlier explained). The historical usage 46 may thus be ignored or deleted, thus causing the security controller 272 to adapt to its new owner.

Figure 23:
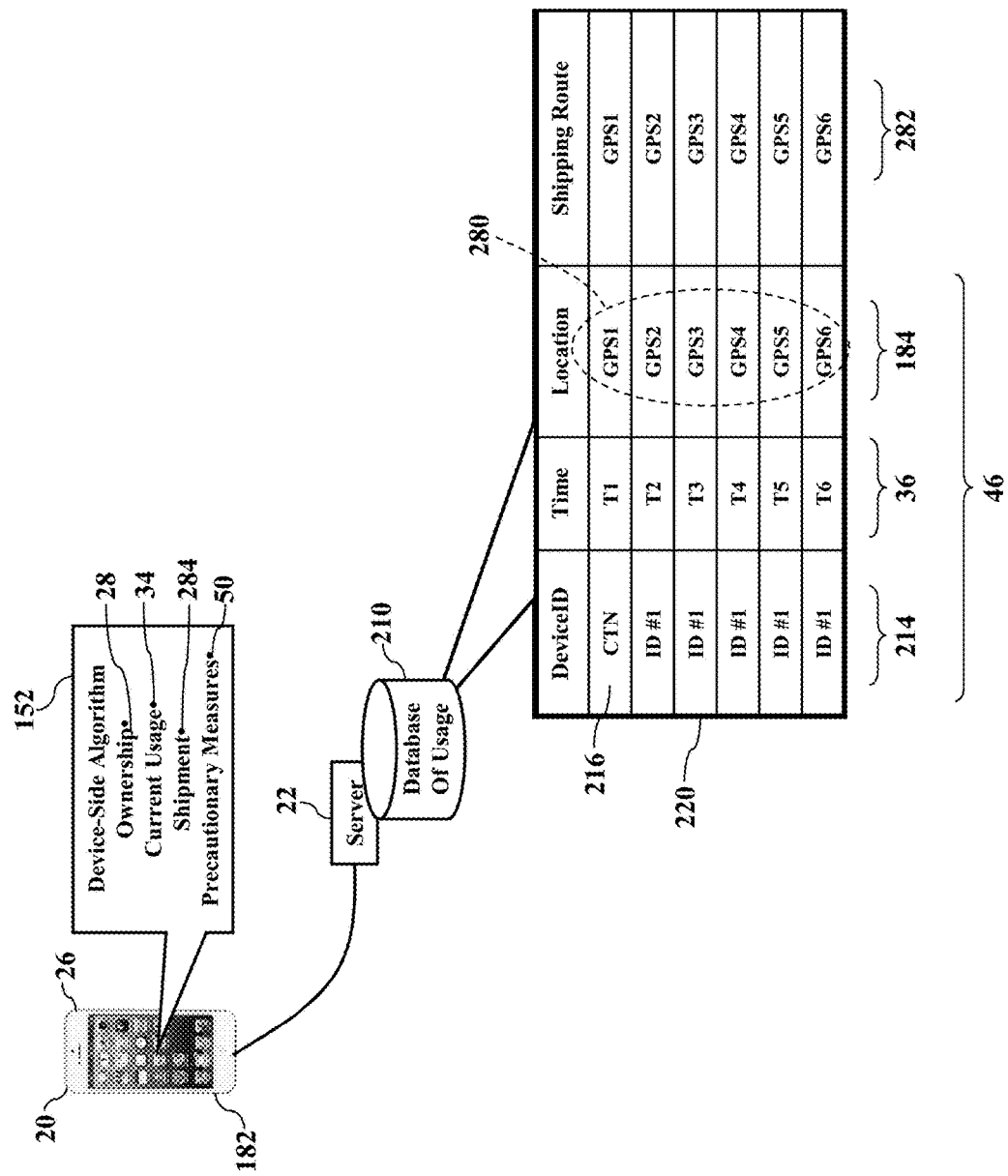
FIG. 23 further illustrates ownership, according to exemplary embodiments.

FIG. 23 further illustrates the ownership 28, according to exemplary embodiments. Here the GPS information 184 may be used to infer new ownership 28. Recall that the smart device 20 may report its current location 38 using the GPS information 184 determined by the GPS transceiver 182. Over time, then, the smart device 20 makes sequential usage reports. FIG. 23, for example, illustrates a sequence 280 of the GPS information 184 logged in the database 210 of usage. The sequence 280 of the GPS information 184 may then be compared to known shipping routes 282. The shipping routes 282 may be predefined by major postal and package carriers (such as FEDERAL EXPRESS® and UPS®. In actual practice the shipping routes 282 would likely be stored in a separate electronic database. For simplicity, though, FIG. 23 illustrates the database 210 of usage having additional entries for possible shipping routes 282 (perhaps both pickup and delivery routes) defined as their corresponding sequential GPS information 184. If the sequence 280 reported by the smart device 20 matches at least a portion of one of the possible shipping routes 282, then exemplary embodiments may conclude that the smart device 20 is a shipment 284 and the ownership 28 may have changed. The smartphone 26, in other words, is likely packaged as the shipment 284 for delivery to a new owner.

Real time reporting may lend confidence. Some delivery vehicles report their location in real time. Exemplary embodiments may thus confidently predict the shipment 284 if the movements of the smart device 20 nearly or even exactly match a delivery vehicle. For example, suppose a delivery vehicle reports or logs its nearly real time location as routes are driven. If the sequence 280 of the GPS information 184 (reported by the smart device 20) nearly or even exactly matches the time and location associated with a delivery vehicle traversing one of the shipping routes 282, then exemplary embodiments may more confidently conclude that the smart device 20 is the shipment 284 and the ownership 28 may have changed.

The precautionary measures 50 may be implemented. When the shipment 284 indicates that the ownership 28 may have changed, exemplary embodiments may require the re-authentication procedure 52 (as earlier explained). If no input is detected in response to the re-authentication procedure 52, exemplary embodiments may confirm the shipment 284 and assume new ownership 28. However, if an input is received (even if incorrect), the ownership 28 may or may not have changed. Indeed, an incorrect response to the re-authentication procedure 52 may indicate nefarious activity or even stolen possession. The default operation 60 may again be required and reversion to the factory settings 62 (as earlier explained). If an incorrect response is received to the re-authentication procedure 52, exemplary embodiments may assume possession is not legitimate and perhaps the smart device 20 is stolen. Again, then, exemplary embodiments may revert to the factory settings 62 as a protection precaution.

Figure 24:
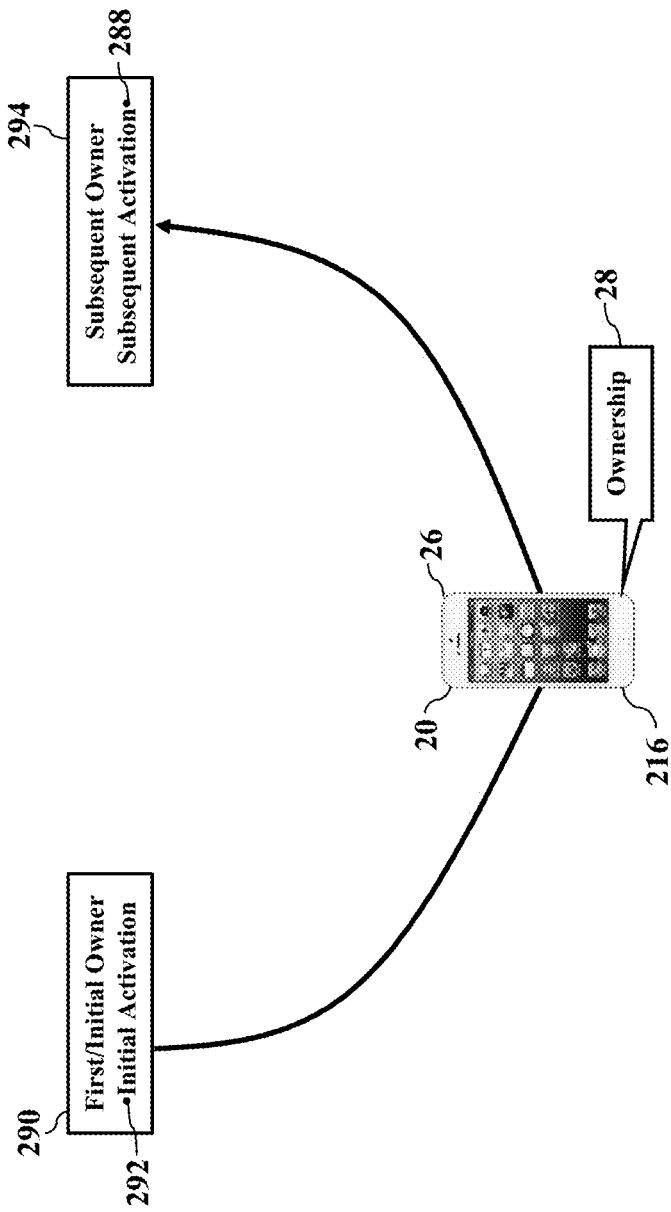
FIGS. 24-25 illustrate seller approval, according to exemplary embodiments.
Figure 25:
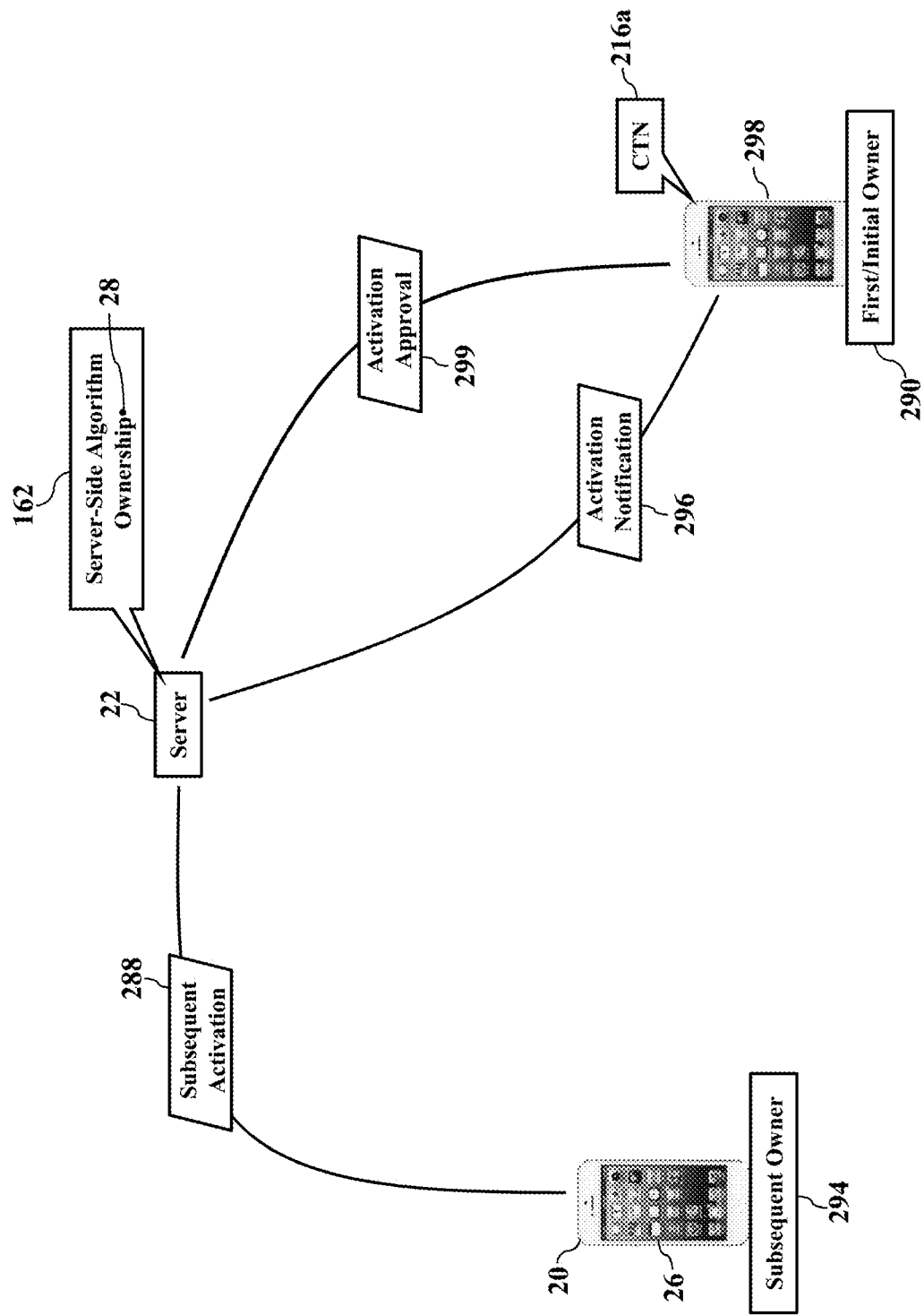

FIGS. 24-25 illustrate seller approval, according to exemplary embodiments. When the smartphone 26 is sold or transferred, the selling or transferring party may be required to approve a subsequent activation 288 of the smart device 20. Suppose, for example, the smartphone 26 is initially purchased by an initial first owner 290 and an initial activation 292 is performed. The smartphone 26 is thus initially associated with its initial cellular identifier 216. Later, though, the initial first owner 290 may sell or transfer the smartphone 26 to a second or subsequent owner 294. Even though the possession may legitimately change, the smartphone 26 is still associated with its initial cellular identifier 216. That is, the smartphone 26 will still report, and respond to, its initial cellular identifier 216 registered with the first owner 290, even though its ownership 28 has legitimately changed to the second owner 294. Before the subsequent activation 288 may be performed, the seller may be required to approve or authorize the subsequent activation 288.

FIG. 25 thus illustrates an electronic subsequent activation notification 296. Whenever the smartphone 26 is presented by its new owner for the subsequent activation 288, exemplary embodiments may alert the owner/subscriber of record. The server-side algorithm 162, for example, may send the subsequent activation notification 296 as a text message, email, or other electronic message to the initial cellular identifier 216. Because the initial owner 290 has likely activated a new smartphone 298, the initial owner 290 likely ported the cellular telephone number ("CTN") 216 to the new smartphone 298. Exemplary embodiments may thus query a subscriber database (not shown for simplicity) to confirm cellular portability of the cellular telephone number ("CTN") 216 to a serial number or other identifier associated with the new smartphone 298. The subsequent activation notification 296 will thus route and deliver to the new smartphone 298 associated with the initial cellular identifier 216. The now-used smartphone 26, in other words, will not receive the subsequent activation notification 296, so there is little chance of nefarious approval. When the new smartphone 298 receives the subsequent activation notification 296, the initial owner 290 is alerted to the attempted subsequent activation 288 by the alleged second owner 294. If the initial owner 290 responds with an activation approval 299, then the server 22 may permit or authorize the subsequent activation 288 as a legitimate transfer. However, if the initial owner 290 responds with a denial, then the server 22 may deny the subsequent activation 288 as an illegitimate transfer. The server 22 may thus generate an instruction for the smartphone 26 to implement the precautionary efforts 50, as earlier explained.

Figure 26:
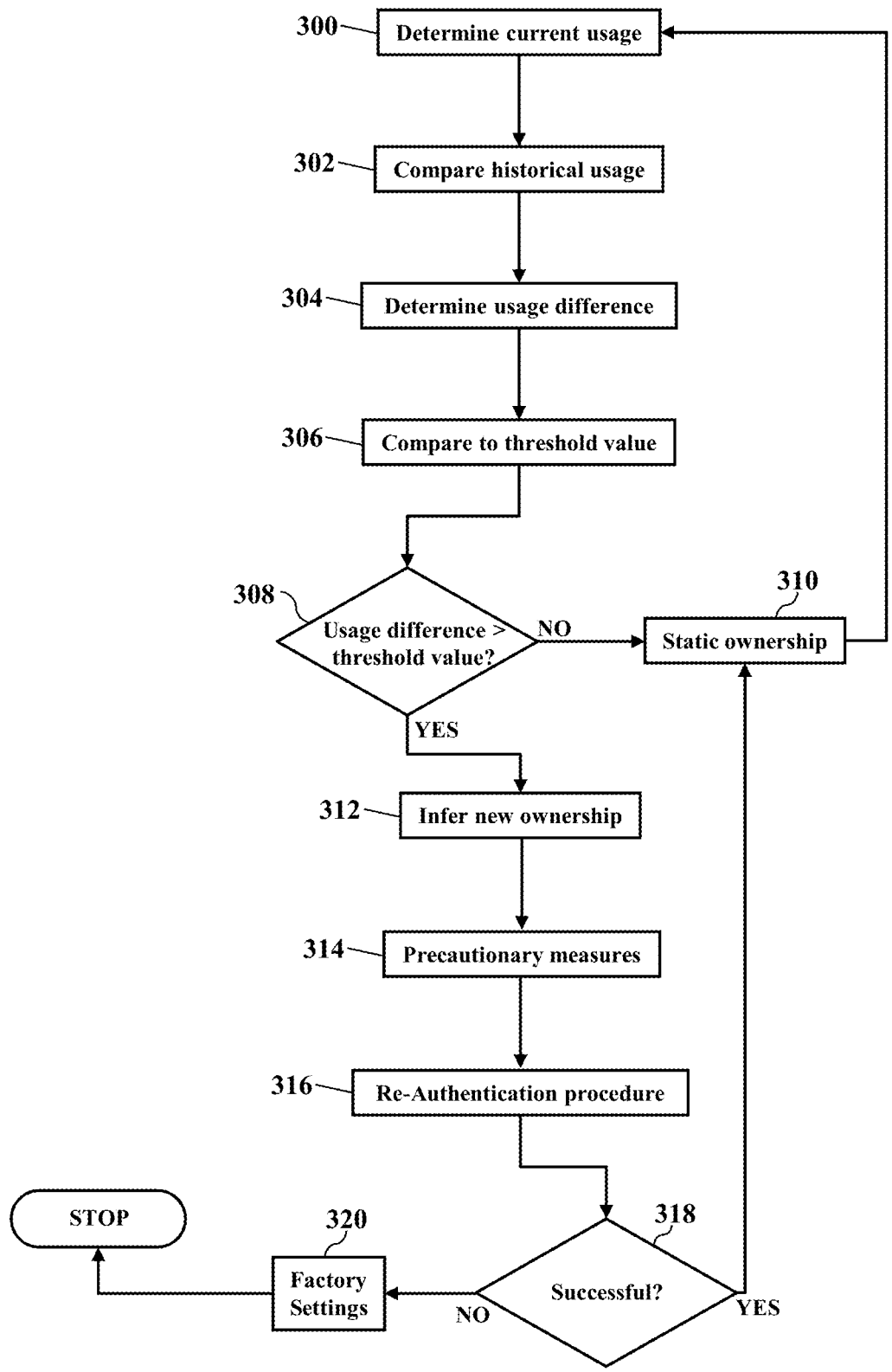
FIG. 26 is a flowchart illustrating an algorithm or method for contextual ownership, according to exemplary embodiments.

FIG. 26 is a flowchart illustrating an algorithm or method for contextual ownership, according to exemplary embodiments. The current usage 34 is determined (Block 300) and compared to the historical usage 46 (Block 302). The usage difference 88 is determined (Block 304) and compared to the threshold value 90 (Block 306). If the usage difference 88 is less than or equal to the threshold value 90 (Block 308), then ownership 28 is constant (Block 310). However, if the usage difference 88 equals or exceeds the threshold value 90 (Block 308), then new ownership 28 may be inferred (Block 312). The precautionary measures 50 may be implemented (Block 314) and the re-authentication procedure 52 performed (Block 316). If the user successfully re-authenticates (Block 318), then the ownership 28 is constant (Block 310). However, if re-authentication fails (Block 318), then revert to the factory settings (Block 320).

Figure 27:
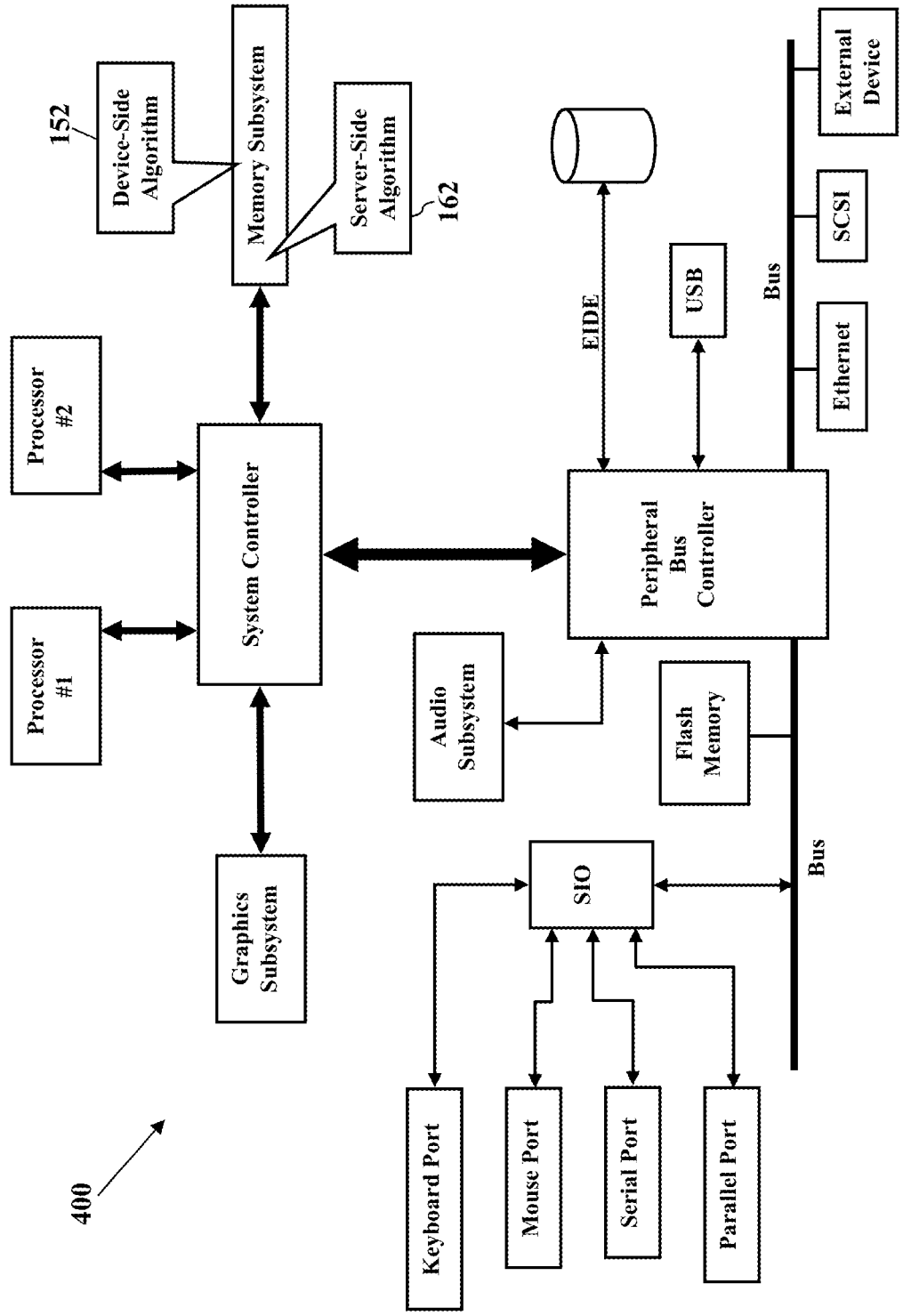
FIGS. 27-32 depict still more operating environments for additional aspects of the exemplary embodiments.

FIG. 27 illustrates still more exemplary embodiments. FIG. 27 is a more detailed diagram illustrating a processor-controlled device 400. As earlier paragraphs explained, exemplary embodiments may partially or entirely operate in any mobile or stationary processor-controlled device. FIG. 27, then, illustrates the device-side algorithm 152 and/or the server-side algorithm 162 stored in a memory subsystem of the processor-controlled device 400. One or more processors communicate with the memory subsystem and execute either, some, or all applications. Because the processor-controlled device 400 is well known to those of ordinary skill in the art, no further explanation is needed.

Figure 28:
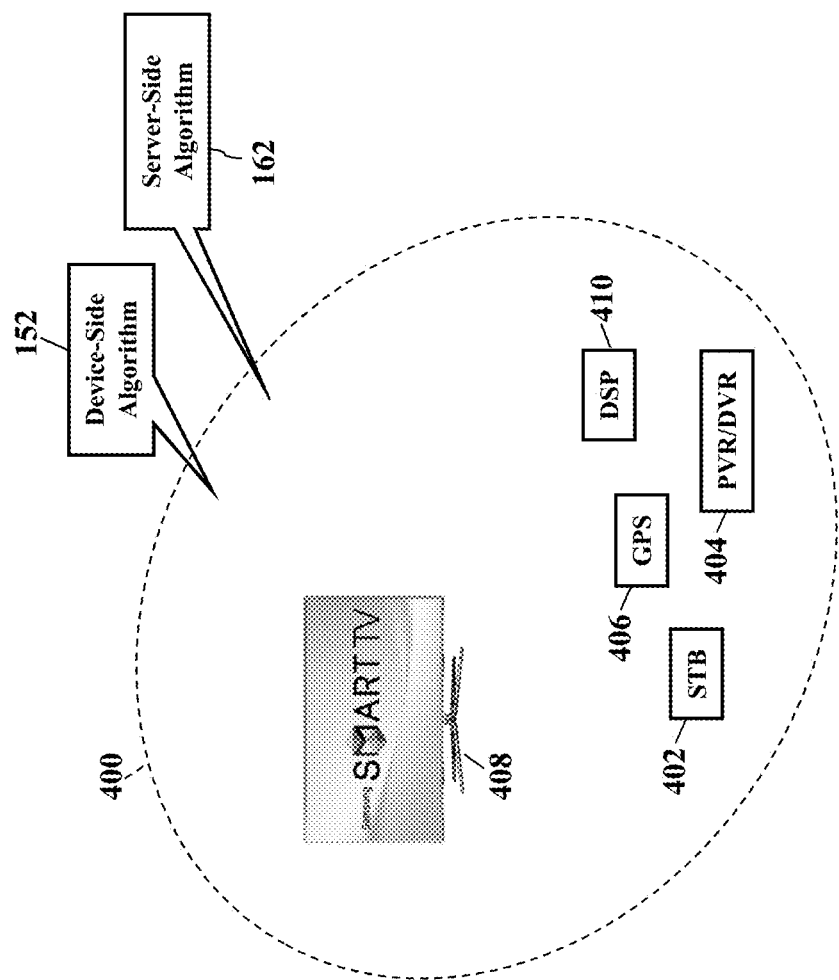

FIG. 28 depicts other possible operating environments for additional aspects of the exemplary embodiments. FIG. 28 illustrates the device-side algorithm 152 and/or the server-side algorithm 162 operating within various other processor-controlled devices 400. FIG. 28, for example, illustrates a set-top box ("STB") (402), a personal/digital video recorder (PVR/DVR) 404, a Global Positioning System (GPS) device 406, an interactive television 408, and any other computer system, communications device, or processor-controlled device utilizing the processor and/or a digital signal processor (DP/DSP) 410. The device 400 may also include watches, radios, vehicle electronics, clocks, printers, gateways, mobile/implantable medical devices, and other apparatuses and systems. Because the architecture and operating principles of the various devices 400 are well known, the hardware and software componentry of the various devices 400 are not further shown and described.

Figure 29:
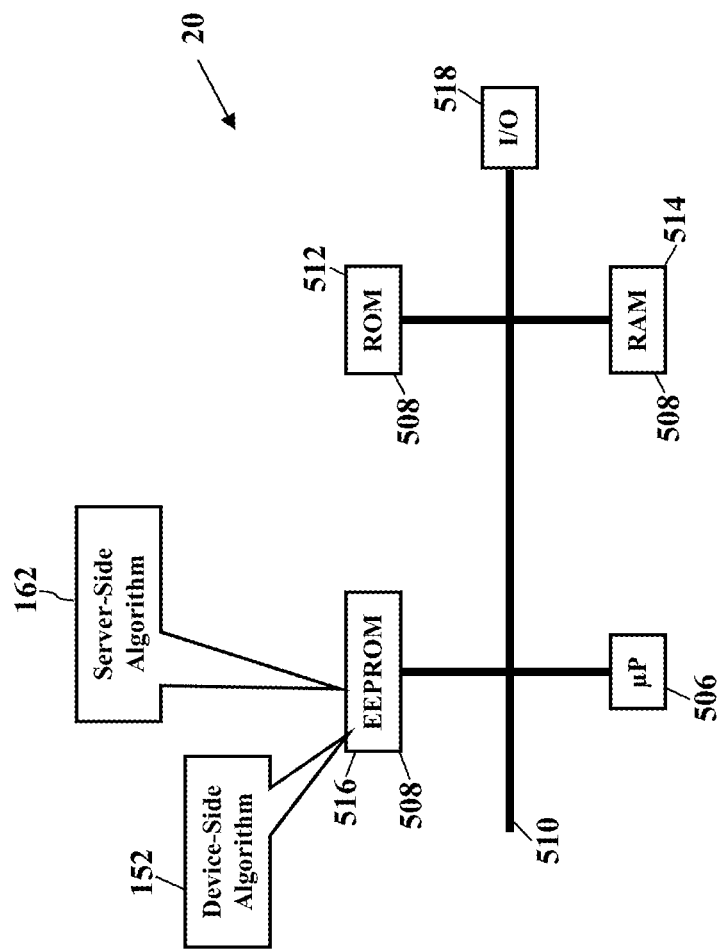
Figure 30:
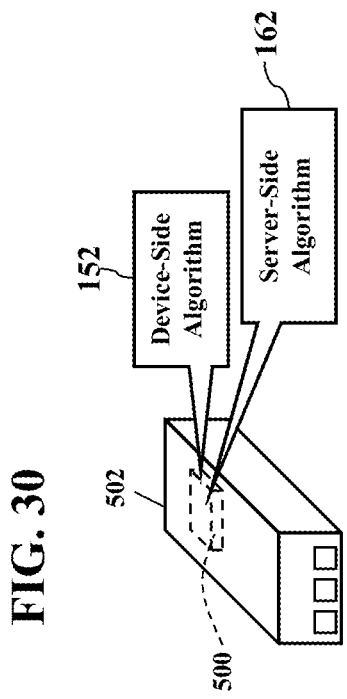
Figure 31:
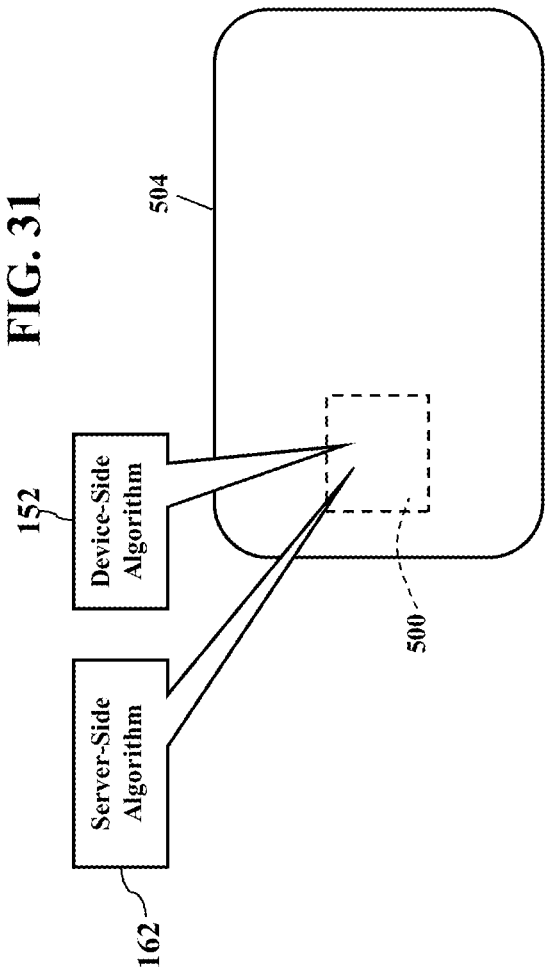

FIGS. 29-31 are schematics further illustrating the smart device 20, according to exemplary embodiments. FIG. 29 is a block diagram of a Subscriber Identity Module 500, while FIGS. 30 and 31 illustrate, respectively, the Subscriber Identity Module 500 embodied in a plug 502 and in a card 504. As those of ordinary skill in the art recognize, the Subscriber Identity Module 500 may be used in conjunction with many devices (such as the smartphone 112). The Subscriber Identity Module 500 stores user information (such as the cellular identifier 216, a user's International Mobile Subscriber Identity, the user's $K_i$ number, and other user information) and any portion of the device-side algorithm 152 and/or the server-side algorithm 162. As those of ordinary skill in the art also recognize, the plug 502 and the card 504 each may interface with any mobile or stationary device.

FIG. 29 is a block diagram of the Subscriber Identity Module 500, whether embodied as the plug 502 of FIG. 30 or as the card 504 of FIG. 31. Here the Subscriber Identity Module 500 comprises a microprocessor 506 (µP) communicating with memory modules 508 via a data bus 510. The memory modules 508 may include Read Only Memory (ROM) 512, Random Access Memory (RAM) and or flash memory 514, and Electrically Erasable-Programmable Read Only Memory (EEPROM) 516. The Subscriber Identity Module 500 stores some or all of the device-side algorithm 152 and/or the server-side algorithm 162 in one or more of the memory modules 508. FIG. 29 shows the device-side algorithm 122, the network-side algorithm 132, and/or the third party-side algorithm 142 residing in the Erasable-Programmable Read Only Memory 516, yet either module may alternatively or additionally reside in the Read Only Memory 512 and/or the Random Access/Flash Memory 514. An Input/Output module 518 handles communication between the Subscriber Identity Module 500 and the connected device 22. Because Subscriber Identity Modules are well known in the art, this patent will not further discuss the operation and the physical/memory structure of the Subscriber Identity Module 500.

Figure 32:
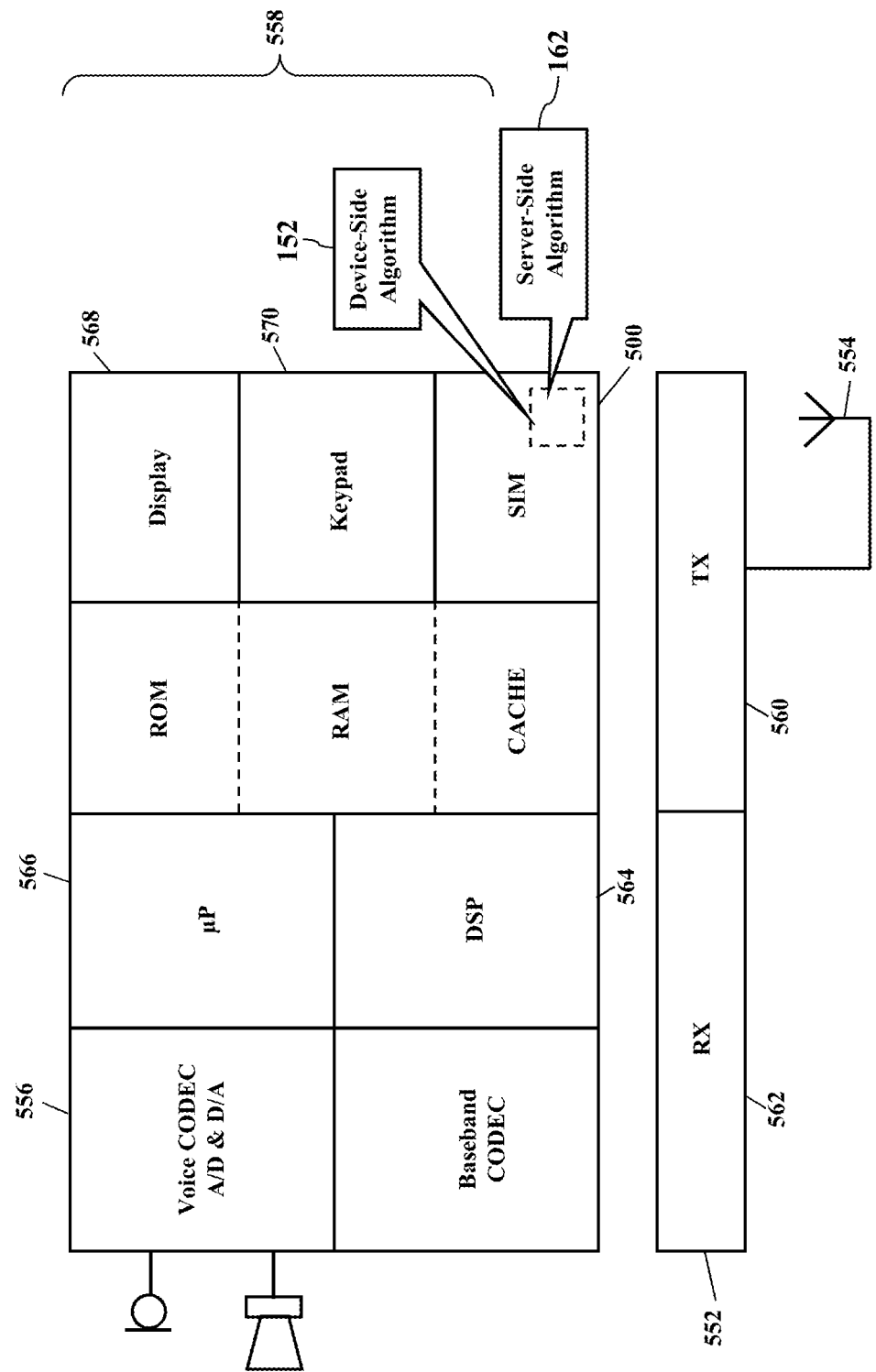

FIG. 32 is a schematic further illustrating the operating environment, according to exemplary embodiments. FIG. 32 is a block diagram illustrating more componentry of the smart device 20. The componentry may include one or more radio transceiver units 552, an antenna 554, a digital baseband chipset 556, and a man/machine interface (MMI) 558. The transceiver unit 552 includes transmitter circuitry 560 and receiver circuitry 562 for receiving and transmitting radio-frequency (RF) signals. The transceiver unit 552 couples to the antenna 554 for converting electrical current to and from electromagnetic waves. The digital baseband chipset 556 contains a digital signal processor (DSP) 564 and performs signal processing functions for audio (voice) signals and RF signals. As FIG. 32 shows, the digital baseband chipset 556 may also include an on-board microprocessor 566 that interacts with the man/machine interface (MMI) 558. The man/machine interface (MMI) 558 may comprise a display device 568, a keypad 570, and the Subscriber Identity Module 500. The on-board microprocessor 566 may also interface with the Subscriber Identity Module 500 and with the device-side algorithm 152 and/or the server-side algorithm 162.

Exemplary embodiments may be applied to any signaling standard. As those of ordinary skill in the art recognize, FIGS. 29-32 may illustrate a Global System for Mobile (GSM) communications device. That is, exemplary embodiments may utilize the Global System for Mobile (GSM) communications signaling standard. Those of ordinary skill in the art, however, also recognize that exemplary embodiments are equally applicable to any communications device utilizing the Time Division Multiple Access signaling standard, the Code Division Multiple Access signaling standard, the "dual-mode" GSM-ANSI Interoperability Team (GAIT) signaling standard, or any variant of the GSM/CDMA/TDMA signaling standard. Exemplary embodiments may also be applied to other standards, such as the I.E.E.E. 802 family of standards, the Industrial, Scientific, and Medical band of the electromagnetic spectrum, BLUETOOTH®, and any other.

Exemplary embodiments may be physically embodied on or in a computer-readable memory device or other storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for determining contextual ownership, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A method, comprising:

receiving, by a server, a network identifier describing a current context associated with a smart device;

identifying, by the server, a historical network identifier describing a historical context historically associated with the smart device;

determining, by the server, a usage difference between the current context and the historical context based on the network identifier and the historical network identifier;

determining, by the server, a new ownership of the smart device in response to the usage difference between the current context and the historical context based on the current network identifier and the historical network identifier;

prompting, by the server, the smart device for a security credential in response to the new ownership; and disabling, by the server, a feature of the smart device in response to a failure of the security credential to authenticate.

2. The method of claim 1, further comprising receiving a physiological data reported by the smart device.

3. The method of claim 2, further comprising determining the current context based on the physiological data reported by the smart device.

4. The method of claim 1, further comprising receiving a global positioning system information reported by the smart device.

5. The method of claim 4, further comprising determining the current context based on the global positioning system information reported by the smart device.

6. The method of claim 1, further comprising reverting to a factory setting associated with the smart device in response to the failure of the security credential to authenticate.

7. The method of claim 1, further comprising deleting data stored by the smart device in response to the failure of the security credential to authenticate.

8. A system, comprising:

a hardware processor; and a memory device, the memory device storing instructions, the instructions when executed causing the hardware processor to perform operations, the operations comprising:

receiving a network identifier describing a current context associated with a smart device;

identifying a historical network identifier describing a historical context historically associated with the smart device;

determining a usage difference between the current context and the historical context based on the network identifier and the historical network identifier;

determining a new ownership of the smart device in response to the usage difference between the current context and the historical context based on the network identifier and the historical network identifier;

prompting the smart device for a security credential in response to the new ownership; and disabling a feature of the smart device in response to a failure of the security credential to authenticate.

9. The system of claim 8, wherein the operations further comprise receiving a physiological data reported by the smart device.

10. The system of claim 9, wherein the operations further comprise determining the current context based on the physiological data reported by the smart device.

11. The system of claim 8, wherein the operations further comprise receiving a global positioning system information reported by the smart device.

12. The system of claim 11, wherein the operations further comprise determining the current context based on the global positioning system information reported by the smart device.

13. The system of claim 8, wherein the operations further comprise reverting to a factory setting associated with the smart device in response to the failure of the security credential to authenticate.

14. The system of claim 8, wherein the operations further comprise deleting data stored by the smart device in response to the failure of the security credential to authenticate.

15. A memory device storing instructions that when executed cause a hardware processor to perform operations, the operations comprising:

receiving a network identifier describing a current context associated with a smart device;

identifying historical network identifiers describing a historical context historically associated with the smart device;

determining a usage difference between the current context and the historical context in response to the network identifier failing to match the historical network identifiers;

determining a new ownership of the smart device in response to the usage difference between the current context and the historical context;

prompting the smart device for a security credential in response to the new ownership; and disabling a feature of the smart device in response to a failure of the security credential to authenticate.

16. The memory device of claim 15, wherein the operations further comprise receiving a physiological data reported by the smart device.

17. The memory device of claim 16, wherein the operations further comprise determining the current context based on the physiological data reported by the smart device.

18. The memory device of claim 15, wherein the operations further comprise receiving a global positioning system information reported by the smart device.

19. The memory device of claim 18, wherein the operations further comprise determining the current context based on the global positioning system information reported by the smart device.

20. The memory device of claim 15, wherein the operations further comprise reverting to a factory setting associated with the smart device in response to the failure of the security credential to authenticate.

* * * * *